(12) United States Patent
Koyama

(10) Patent No.: US 6,919,992 B2
(45) Date of Patent: Jul. 19, 2005

(54) COLOR SEPARATING-COMBINING OPTICAL SYSTEM, IMAGE DISPLAY OPTICAL SYSTEM, AND PROJECTION IMAGE DISPLAY APPARATUS

(75) Inventor: Takehiro Koyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 10/261,538

(22) Filed: Sep. 30, 2002

(65) Prior Publication Data

US 2003/0063389 A1 Apr. 3, 2003

(30) Foreign Application Priority Data

Oct. 1, 2001 (JP) .......................................... 2001-305497
Nov. 14, 2001 (JP) .......................................... 2001-348831

(51) Int. Cl.⁷ .............................................. G02B 27/10
(52) U.S. Cl. ........................................ 359/629; 359/632
(58) Field of Search ................................ 359/629, 630, 359/631, 632, 633, 634, 618

(56) References Cited

U.S. PATENT DOCUMENTS

| 6,441,972 B1 * | 8/2002 | Lesniak et al. ............. 359/741 |
| 6,478,430 B2 | 11/2002 | Wada |
| 2001/0021002 A1 | 9/2001 | Kodama et al. |
| 2002/0067469 A1 | 6/2002 | Eguchi et al. |

FOREIGN PATENT DOCUMENTS

| JP | 10-142692 | 5/1998 |
| JP | 2000-241917 | 8/2000 |
| JP | 2000-275730 | 10/2000 |
| JP | 2001-264744 | 9/2001 |
| JP | 2002-055389 | 2/2002 |

OTHER PUBLICATIONS

English translation of brief description of Figs 10 and 11, and paragraphs 52 and 53 from JP–10142692.
English language abstract for Japanese Patent No. 3,000,977, Jan. 17, 2000.
U.S. Appl. No. 2001–0021002 A1 –Sep. 13, 2001 (corresponding to JP 2001–264744).

* cited by examiner

Primary Examiner—Hung Xuan Dang
(74) Attorney, Agent, or Firm—Morgan & Finnegan, L.L.P.

(57) ABSTRACT

The present invention relates to a color separating-combining optical system of a configuration having a separating optical system which separates light from a light source into a plurality of color spectrums; a combining optical system which combines light spectrums from a plurality of image display elements illuminated by the respective color spectrums; a filter which transmits a color spectrum of a specific wavelength band out of the plurality of color spectrums separated by the separating optical system; and a plurality of polarizing elements each disposed on the light entrance side of the plurality of image display elements, the polarizing elements being adapted to analyze the corresponding color spectrums incident to the respective image display elements. The color separating-combining optical system is further characterized in that the filter is placed apart from the polarizing element corresponding to the color spectrum transmitted by the filter.

39 Claims, 16 Drawing Sheets

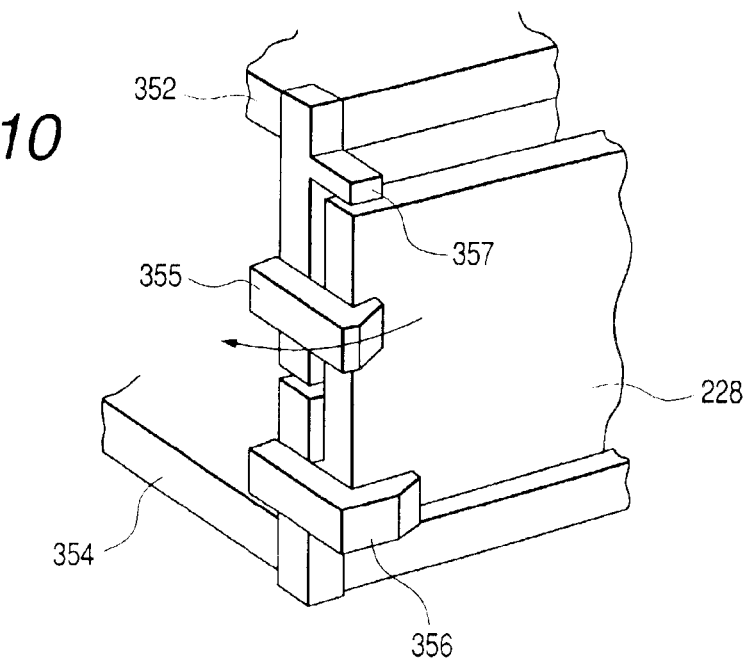
FIG. 10
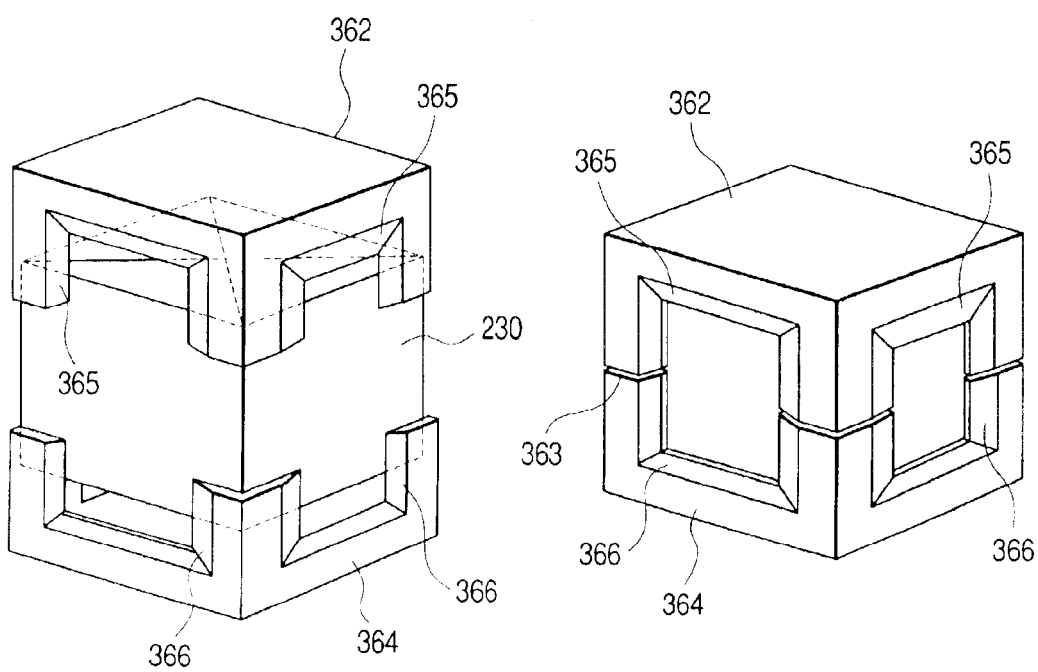
FIG. 11A
FIG. 11B

COLOR SEPARATING-COMBINING OPTICAL SYSTEM, IMAGE DISPLAY OPTICAL SYSTEM, AND PROJECTION IMAGE DISPLAY APPARATUS

BACKGROUND OF THE INVENTION

1. Field of the Invention

The present invention relates to a color separating-combining optical system configured to separate light from a light source into a plurality of color spectrums, guide these color spectrums to respective image display elements, and combine the color spectrums modulated by these image display elements, and an image display optical system and projection image display apparatus using it.

2. Related Background Art

As an optical system in the projection image display apparatus such as liquid crystal projectors and the like, there is a known optical system of a three panel type in which white light emitted from a light source is separated into three color spectrums of red, green, and blue by dichroic films (dielectric films) with wavelength selectivity, the three color spectrums are transmitted or reflected, and modulated by the image display elements such as liquid crystal panels or the like for the respective colors, the color spectrums modulated are combined by dichroic films, and the combined light is enlarged and projected onto a screen or the like by a projection lens.

A conventional projection image display apparatus of this type will be described referring to FIG. 18. In FIG. 18, reference numeral 1 designates a light source, which includes, for example, a high-intensity extra-high pressure lamp, a metal halide lamp, or the like. Light exiting the light source 1 is reflected by a reflector 2 to enter a first fly's eye lens 3, which is an ensemble of lenses arranged in a grid pattern. The light is then reflected by a total reflection mirror 5 to enter a second fly's eye lens 4. Beams condensed by the second fly's eye lens 4 are then incident into a polarization changer 4 to be aligned into a certain polarization orientation. The light aligned in the polarization orientation is then condensed by a condenser lens 7 to be guided to a dichroic mirror 8, which reflects a spectrum of a blue frequency band. The dichroic mirror 8 thus separates the blue light from the incident light. This blue light passes through a concave lens 9 having the effect of shortening the path length, is then reflected by a total reflection mirror 11, and travels through a field lens 20 and an entrance-side polarizing plate 23 to enter a liquid crystal panel 26 for blue. The light passing through the blue-reflecting dichroic mirror 8 passes through a concave lens 10 and is then separated into green light and red light by a green-reflecting dichroic mirror 12, which reflects a spectrum of a green frequency band. The reflected green light passes through a field lens 19 and an entrance-side polarizing plate 22 to enter a liquid crystal panel 25 for green. The red light passing through the dichroic mirror 12 travels via field lenses 14, 18, a relay lens 16, and total reflection mirrors 15, 17, and through a red-entrance polarizing plate 21, and then reaches a liquid crystal panel 24 for red. Each light reaching the corresponding liquid crystal panel 24, 25, 26 is modulated in light intensity corresponding to an image signal in the liquid crystal panel 24, 25, 26, and thereafter passes through an exit-side polarizing plate 27, 28, or 29. Then the color spectrums are combined in a cross prism 30 having dichroic films evaporated. The light exiting the prism 30 is further enlarged and projected onto a screen (not shown) by a projection lens 31. The light spectrums reaching the blue liquid crystal panel 26, green liquid crystal panel 25, and red liquid crystal panel 24 of the three colors are defined by the spectral distribution of the light source and the cut wavelengths of the dichroic films of the dichroic mirrors 8, 12, and there is a need for provision of trimming filters for removing unwanted color light in order to enhance color purity. The trimming filter has a dichroic film (dielectric film), so that the dichroic film removes unwanted color light (unwanted wavelength band). Since the dichroic film varies its cut wavelengths, depending upon angles of incidence of light, the trimming filter is located at a position where principal rays are nearly parallel. In general, the region near the liquid crystal panel is a place where principal rays are closest to parallel rays. For this reason, the trimming filter (dichroic film) was often stuck to a substrate of the entrance-side polarizing plate or the field lens in the vicinity of the liquid crystal panel. In this case, as shown in FIG. 19, the trimming filter 32 was deposited on the flat side of the field lens 18, 19, or 20, and then the polarizing plate 21, 22, or 23 was further stuck thereonto. The polarizing plate 21, 22, 23 is cooled by air from a fan 33 disposed below the field lens 18, 19, 20.

In recent years, the liquid crystal projectors using the liquid crystal panels utilize 150 W or 200 W lamps and, in order to achieve higher intensity, higher wattage lamps tend to be used. The aforementioned trimming filter (dichroic film) absorbs heat while removing the unwanted light. The heat thus absorbed is transmitted to the polarizing plate to increase the temperature of the polarizing plate. If the temperature of the polarizing plate increases to near the durable temperature of the polarizing plate, there is a possibility of deterioration of the polarizing plate. The absorption of heat by the trimming filter (dichroic film) is thus very disadvantageous to cooling of the polarizing plate.

Incidentally, the cross prism for color combining described above is composed of a combination of four prisms with evaporated dichroic films. The cross prism is housed together with other optical components in an optical box. In a housing operation, the prism is bonded to a prism seat preliminarily made by plastic molding or made of die-cast aluminum or magnesium. Then the prism seat with the prism is attached to the optical box with screws or the like. This is because the prism seat needs to be detachably attached to the optical box.

In general, the image display elements need to be fixed at the focal position of the projection lens while being adjusted by six-axis adjustment of rotational positions with respective to the vertical, lateral, and longitudinal axes. For this reason, metal plates separate from the seat as a prism base are stuck to the prism itself, and the panels are fixed to the respective metal plates with a UV adhesive or by soldering or the like to form a prism unit. Then the prism unit is detachably attached to the optical system.

FIG. 20 shows the configuration disclosed in Japanese Patent No. 3000977. In this configuration, metal plates 59 to 62 surround the prism 53 like a scaffold, and the liquid crystal panels 54–56 and the polarizing elements and wave plates necessary for use of the panels are fixed through mounting guides 66 to the metal plates. There are also examples in which the polarizing plates are directly bonded to the prism.

In the conventional configuration as shown in FIG. 20, however, the positioning accuracy of the optical members fixed to the prism is defined by bending accuracy of the metal plates and sticking accuracy of the metal plates. Accordingly, there is a problem that it is difficult to enhance the positioning accuracy of the optical members relative to the prism. In addition, since the number of parts is large, there is another problem that assembly requires a lot of time and effort.

SUMMARY OF THE INVENTION

The present invention has been accomplished in order to solve the above problems.

In view of the aforementioned problems, an aspect of the present invention is a color separating-combining optical system comprising:

a separating optical system which separates light from a light source into a plurality of color spectrums;

a combining optical system which combines light spectrums from a plurality of image display elements illuminated by the respective color spectrums;

a filter which transmits a color spectrum of a specific wavelength band out of the plurality of color spectrums separated by the separating optical system; and a plurality of polarizing elements each disposed on the light entrance side of the plurality of image display elements, the polarizing elements being adapted to analyze the corresponding color spectrums incident to the respective image display elements;

wherein the filter is placed apart from the polarizing element corresponding to the color spectrum transmitted by the filter.

The above optical system is preferably configured so that the filter comprises a dichroic film.

The above optical system is preferably configured so as to further comprise a transparent substrate and so that the filter is disposed at least on one surface of the transparent substrate.

The above optical system is preferably configured so as to further comprise a transparent substrate and so that the filter is disposed on one surface of the transparent substrate and the polarizing element is disposed on another surface of the transparent substrate.

The above optical system is preferably configured so that the color spectrum of the specific wavelength band is red light.

In view of the above problems, a further aspect of the present invention is an image display optical system comprising:

the color separating-combining optical system as set forth;

an illumination system which feeds illumination light into the color separating-combining optical system; and a projection optical system which projects combined light exiting the color separating-combining optical system.

In view of the above problems, a further aspect of the present invention is a projection image display apparatus comprising:

a plurality of image display elements; and the image display optical system as set forth.

In view of the above problems, a further aspect of the present invention is a color separating-combining optical system comprising:

a separating optical system which separates light from a light source into a plurality of color spectrums;

a combining optical system which combines light spectrums from a plurality of image display elements illuminated by the respective color spectrums; and a support member which supports at least one of the separating optical system and the combining optical system;

wherein the optical system supported by the support member is a prism type optical element, and wherein the support member comprises a holding portion which holds a second optical member different from the prism type optical element.

The above optical system is preferably configured so that the holding portion has elasticity and the holding portion holds the second optical member by the elasticity.

The above optical system is preferably configured so that the holding portion has elasticity and the holding portion rotatably holds the second optical member by the elasticity.

The above optical system is preferably configured so that the second optical member is either one selected from a polarizing plate, a wave plate, a phase plate, an optical filter, a lens, and an image display element.

In view of the above problems, a further aspect of the present invention is an image display optical system comprising:

the color separating-combining optical system as set forth;

an illumination system which feeds illumination light into the color separating-combining optical system; and a projection optical system which projects combined light exiting the color separating-combining optical system.

In view of the above problems, a further aspect of the present invention is a projection image display apparatus comprising:

a plurality of image display elements; and the image display optical system as set forth.

In view of the above problems, a further aspect of the present invention is a color separating-combining optical system comprising:

a separating optical system which separates light from a light source into a plurality of color spectrums;

a combining optical system which combines light spectrums from a plurality of image display elements illuminated by the respective color spectrums; and a support member which supports at least one of the separating optical system and the combining optical system;

wherein the optical system supported by the support member is a prism type optical element, and wherein the support member comprises a shielding portion which blocks emergence of unwanted light from the prism type optical element.

In view of the above problems, a further aspect of the present invention is an image display optical system comprising:

the color separating-combining optical system as set forth;

an illumination system which feeds illumination light into the color separating-combining optical system; and a projection optical system which projects combined light exiting the color separating-combining optical system.

In view of the above problems, a further aspect of the present invention is a projection image display apparatus comprising:

a plurality of image display elements; and the image display optical system as set forth.

Specific applications of the present invention will be explicitly described in the detailed description of the invention which will follow.

BRIEF DESCRIPTION OF THE DRAWINGS

FIG. 10 is a perspective view of a prism and a prism seat in a liquid crystal projector of a seventh embodiment;

FIGS. 11A and 11B are perspective views of a prism and a prism seat in a liquid crystal projector of an eighth embodiment;

DETAILED DESCRIPTION OF THE PREFERRED EMBODIMENTS (First Embodiment)

Figure 1:
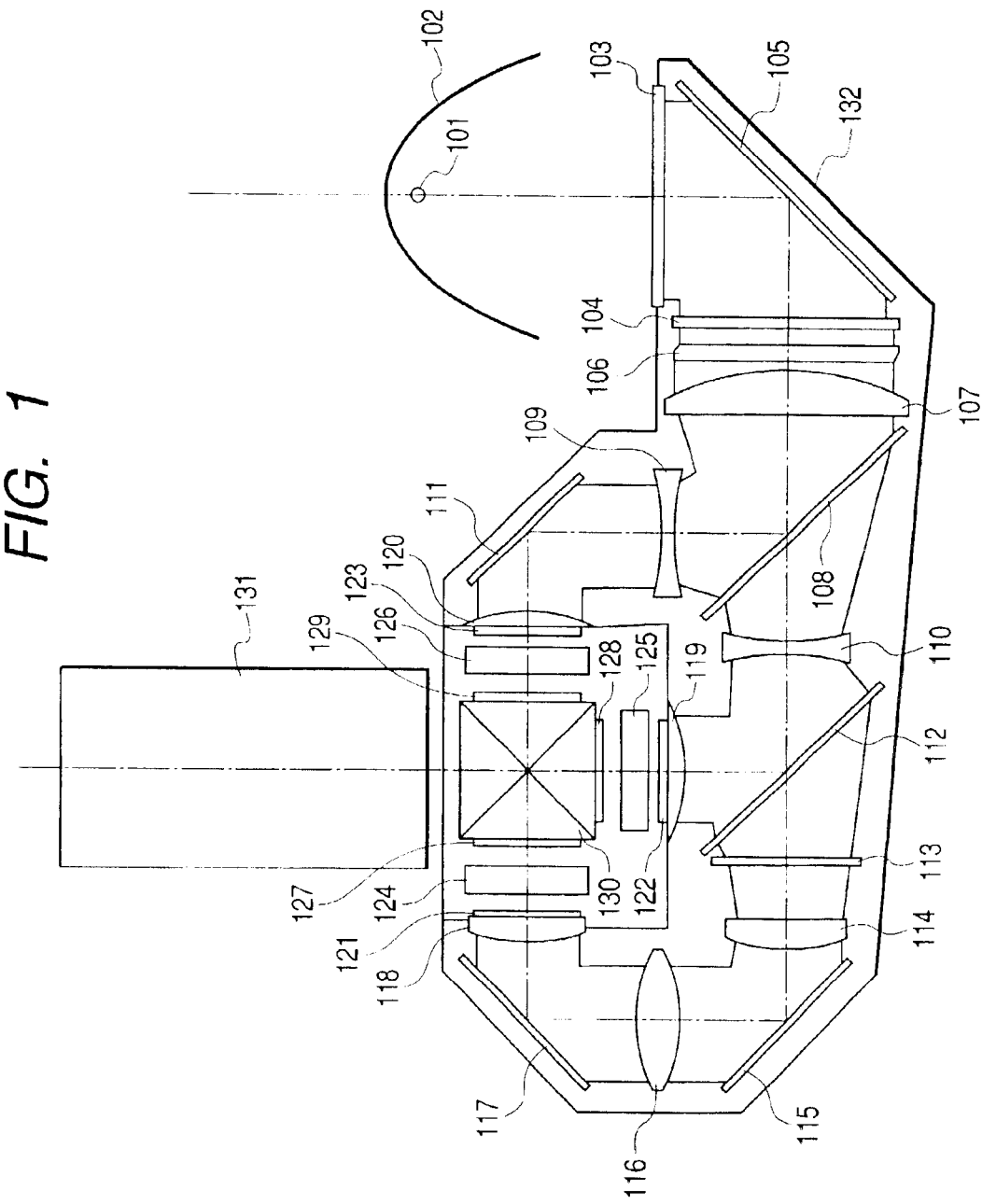
FIG. 1 is an illustration showing an optical system of a liquid crystal projector in a first embodiment.

FIG. 1 shows a configuration of an optical system in a liquid crystal projector (projection image display apparatus) as a first embodiment of the present invention. Reference numeral 101 designates a light source, which is comprised, for example, of a high-intensity extra-high pressure lamp, a metal halide lamp, or the like. Beams emerging from the light source 101 travel directly into a first fly's eye lens 103, which is an ensemble of lenses arranged in a grid pattern, or are reflected by a reflector 102 to enter the first fly's eye lens 103.

The beams divided by the first fly's eye lens 103 are reflected by a reflective mirror 105 and are condensed by a second fly's eye lens 104. The condensed beams are incident into a polarization changer 106 to be aligned into a polarization orientation, and are further condensed by a condenser lens 107.

The beams condensed by the condenser lens 107 are guided to a blue-reflecting dichroic mirror 108, which reflects light in the blue frequency band (hereinafter referred to as blue light). The dichroic mirror 108 separates the blue light from the beams. The blue light travels through a concave lens 109 having the effect of shortening the path length, is reflected by a reflective mirror 111, and then travels through a field lens 120 and an entrance-side polarizing plate 123 to reach a blue liquid crystal panel 126.

The light, having passed through the blue-reflecting dichroic mirror 108, then passes through a concave lens 110 and is separated into green light and red light by a green-reflecting dichroic mirror 112, which reflects light in the green frequency band (hereinafter referred to as green light). The green light reflected by the green-reflecting dichroic mirror 112 travels through a field lens 119 and an entrance-side polarizing plate 122 to reach a blue liquid crystal panel 125.

Furthermore, light in the red frequency band (hereinafter referred to as red light), having passed through the green-reflecting dichroic mirror 112, then passes through a red-transmitting dichroic filter 113, which removes an unwanted component from the red light. Thereafter, the red light passes via a field lens 114, a reflective mirror 115, a relay lens 116, a reflective mirror 117, and a field lens 118 and then passes through a red entrance-side polarizing plate 121 to reach a red liquid crystal panel 124.

The light reaching each liquid crystal panel 124, 125, 126 is modulated according to an image signal fed from an unrepresented image information supply, such as a personal computer, a video cassette recorder, a DVD player, or the like, in the liquid crystal panel. Thereafter, the light thus modulated exits the liquid crystal panel 124, 125, 126, and passes through an exit-side polarizing plate 127, 128, 129. Then the three color spectrums are combined by a cross prism 130 with evaporated dichroic films. Furthermore, the light exiting the cross prism 130 is enlarged and projected onto an unrepresented screen by a projection lens 131.

Numeral 132 denotes an optical box (case) which houses the image display optical system from the first fly's eye lens 103 to the cross prism 130.

The foregoing red-transmitting dichroic filter 113 will be described below. The filter 113 is of structure in which a dichroic film (dielectric film) is deposited on at least one surface of a transparent glass substrate by evaporation. Then this filter 113 is located at the position where principal rays are nearly parallel in the relay system of red path. In this case, the filter 113 is located between the dichroic mirror 112 and the field lens 114. The field lens 118, which is placed on the entrance side of the red liquid crystal panel 124, is of structure in which only the polarizing plate 121 is stuck thereto. Therefore, the heat due to the unwanted light except for the red light, absorbed by the dichroic filter 113, is not transferred to the polarizing plate 121, so as to avoid the deterioration of the polarizing plate 121, whereby the polarizing plate 121 can be effectively cooled by the fan (not shown).

(Second Embodiment)

Figure 2:
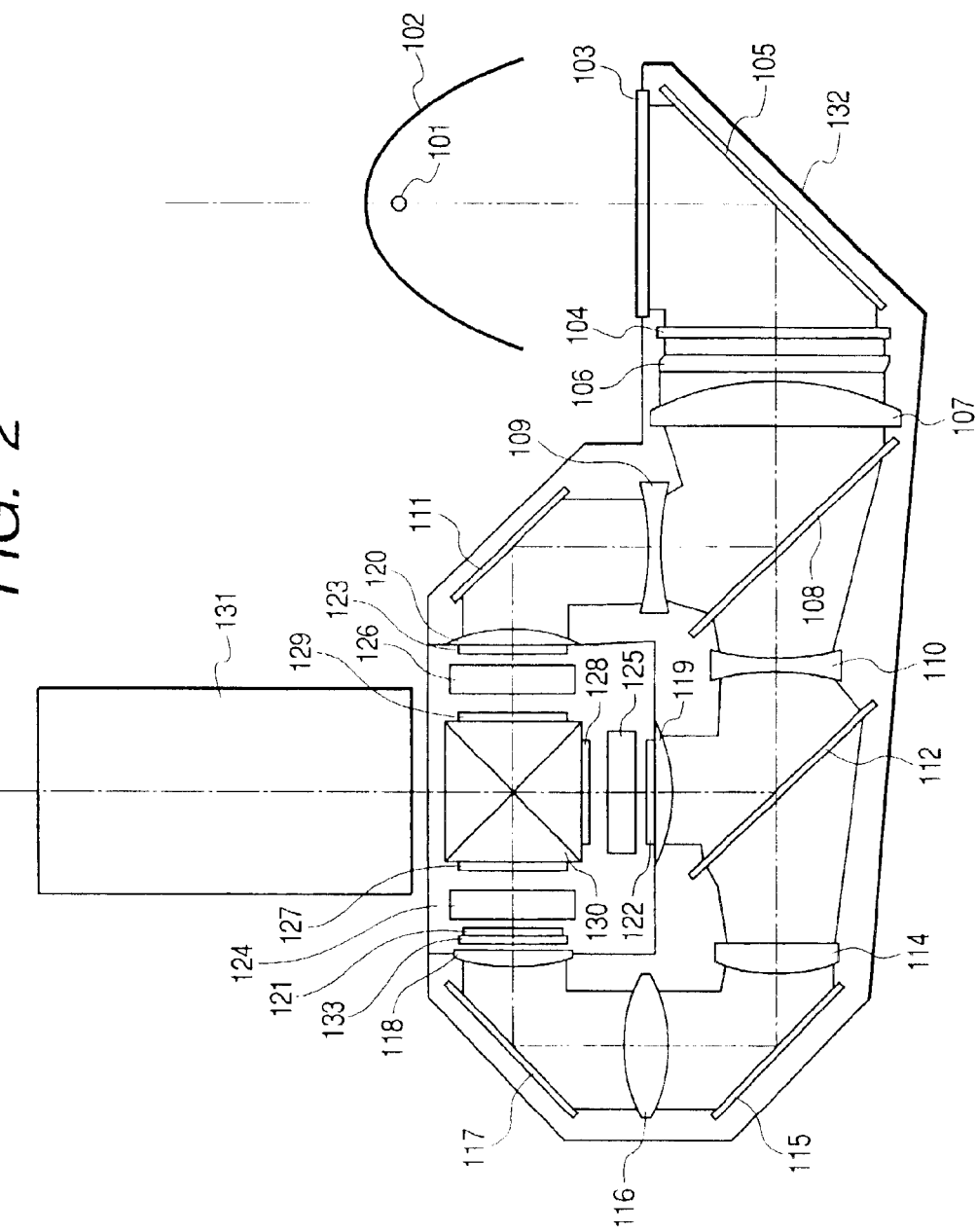
FIG. 2 is an illustration showing an optical system of a liquid crystal projector in a second embodiment.

A liquid crystal projector (projection image display apparatus) as a second embodiment of the present invention will be described next referring to FIGS. 2 and 3. In FIG. 2, the same portions as the constitutive elements in FIG. 1 are denoted by the same reference symbols and the description thereof is omitted herein.

Figure 3:
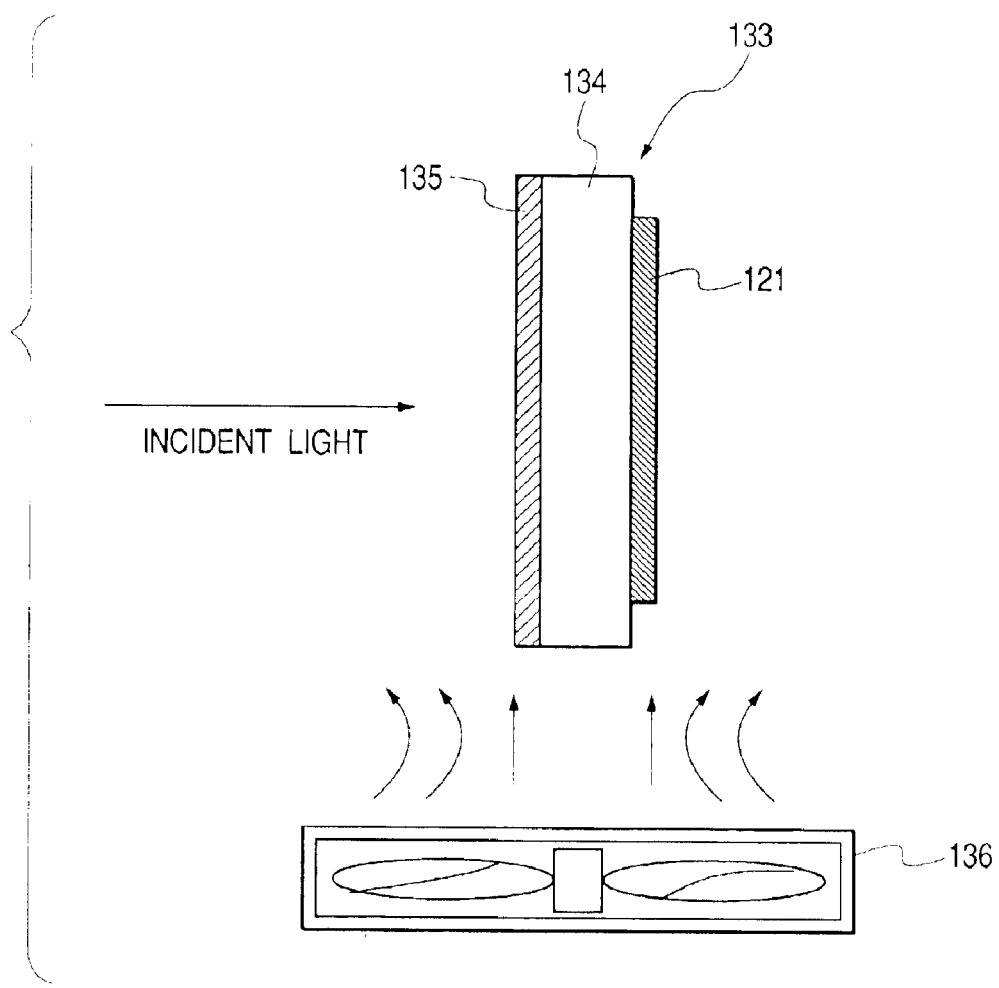
FIG. 3 is an illustration showing a filter and a polarizing plate in the liquid crystal projector of the second embodiment.

In FIGS. 2 and 3, numeral 133 designates a red-transmitting dichroic filter. The dichroic filter 133 is of structure in which a dichroic film 135 is deposited on one surface of a transparent substrate 134, for example such as a sapphire substrate, fluorite, a glass sheet, or the like, by evaporation. The polarizing plate 121 is stuck to the other surface of the transparent substrate 134. Then the dichroic filter 133 is located so that the side of the polarizing plate 121 is positioned on the liquid crystal panel 124 side and the side of the dichroic film 135 on the field lens 118 side. The heat due to the unwanted light except for the red light, absorbed by the dichroic film 135, is transferred to the transparent substrate 134 to be radiated (to effect cooling) at the transparent substrate 134. Accordingly, the heat absorbed by the dichroic film 135 is not transferred directly to the polarizing plate 121, so as to avoid the deterioration of the polarizing plate 121. As shown in FIG. 3, the filter 133 and the polarizing plate 121 are cooled by cooling air from the fan 136.

(Third Embodiment)

Figure 4:
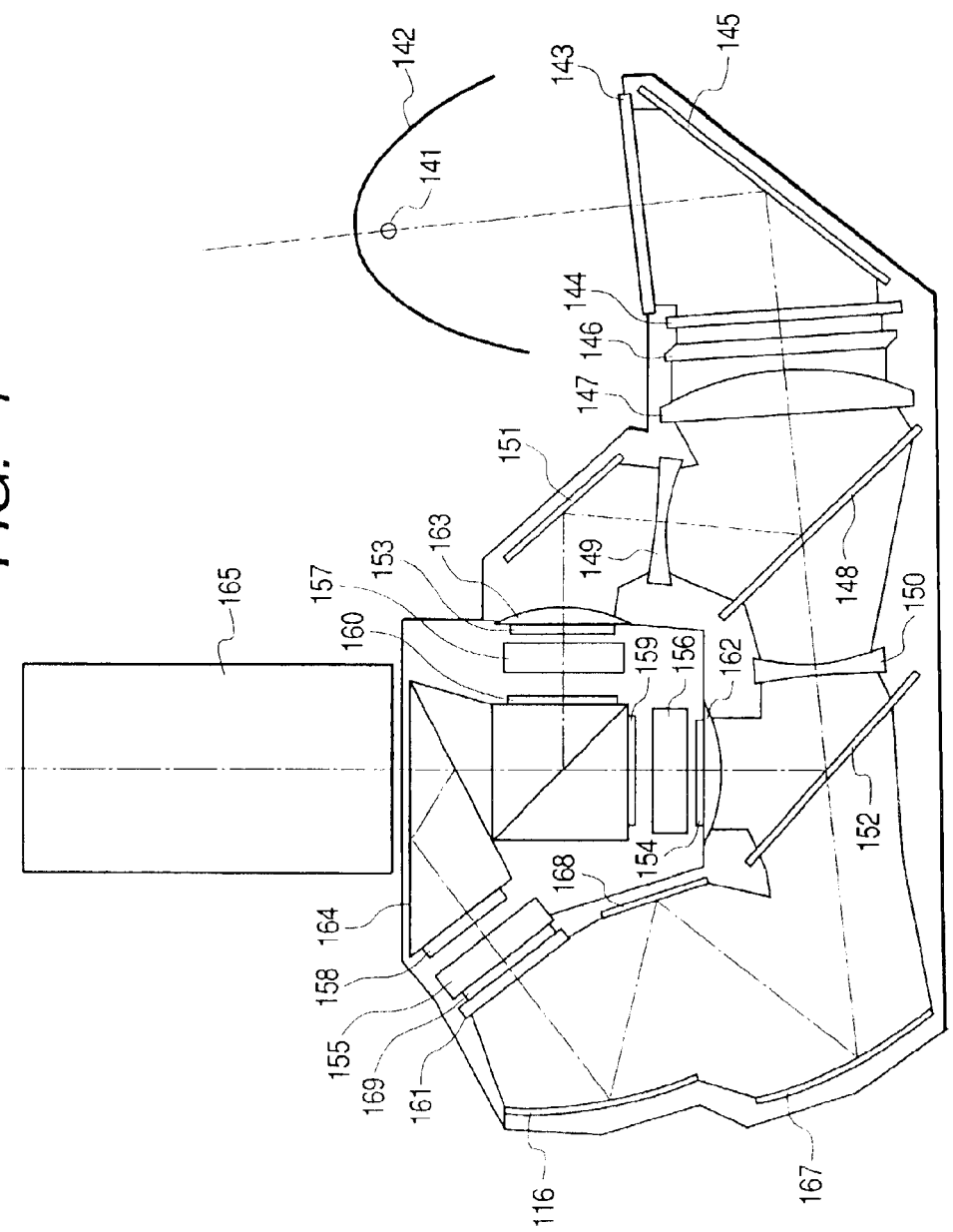
FIG. 4 is an illustration showing an optical system of a liquid crystal projector in a third embodiment.

A projection display apparatus as a third embodiment of the present invention will be described below referring to FIG. 4. In FIG. 4, numeral 141 represents a light source, which includes, for example, a high-intensity extra-high pressure lamp, a metal halide lamp, or the like. The light exiting the light source 141 is reflected by a reflector 142 to enter a first fly's eye lens 143 as an ensemble of lenses arranged in a grid pattern. The light is then reflected by a total reflection mirror 145. The reflected light is further condensed by a second fly's eye lens 144. Beams thus condensed are incident into a polarization changer 146 to be aligned into a polarization orientation. The light thus aligned in the polarization orientation is condensed by a condenser lens 147, and is then guided to a dichroic mirror 148, which reflects the spectrum of the blue frequency band. The blue light reflected by the dichroic mirror 148 passes through a concave lens 149 having the effect of shortening the path length, and the blue light passing through the concave lens 149 is reflected by a total reflection mirror 151. Then the blue light passes through a field lens 163 and an entrance-side polarizing plate 153 to reach a blue liquid crystal panel 157. The light having passed through the blue-reflecting dichroic mirror 148 then passes through a concave lens 150 and is separated into green light and red light by a green-reflecting dichroic mirror 152, which reflects the spectrum of the green frequency band. The green light reflected passes through a field lens 162 and an entrance-side polarizing plate 154 to reach a green liquid crystal panel 156. The red light, having passed through the dichroic mirror 152, is then guided via a free-form surface mirror 167, a concave mirror 168, and a free-form surface mirror 166 to a dichroic filter 161 and an entrance-side polarizing plate 169. The light spectrums transmitted and modulated by the respective color liquid crystal panels 155, 156, 157 travel through corresponding exit-side polarizing plates 158, 159, 160 to become image distributions of light intensity, and they are then combined by a color combining prism 164. The combined light is enlarged and projected onto a screen (not shown) by a projection lens 165. The dichroic filter 161 and the polarizing plate 169 described above are of structure similar to that of the filter described referring to FIG. 3, and are arranged so that the polarizing plate is stuck to one surface of a double-side flat member and the dichroic film (dielectric film) to the other surface. Then the filter 161 and polarizing plate 169 are cooled by cooling air generated by the fan (not shown). This enables efficient cooling of the polarizing plate without increase in the number of parts.

(Fourth Embodiment)

The above-stated embodiment described the configuration in which the red-transmitting dichroic filter was placed in the red path, but the unwanted wavelength band (unwanted light) is distributed in the wavelength band from green to red. Therefore, it is also possible to employ a configuration wherein the light is decomposed into green light and red light at the center wavelength of the unwanted wavelength band and dichroic filters corresponding to the respective colors (green and red) are placed in both of the green path and red path to remove the unwanted light thereby. This embodiment will be described referring to FIG. 5.

Figure 5:
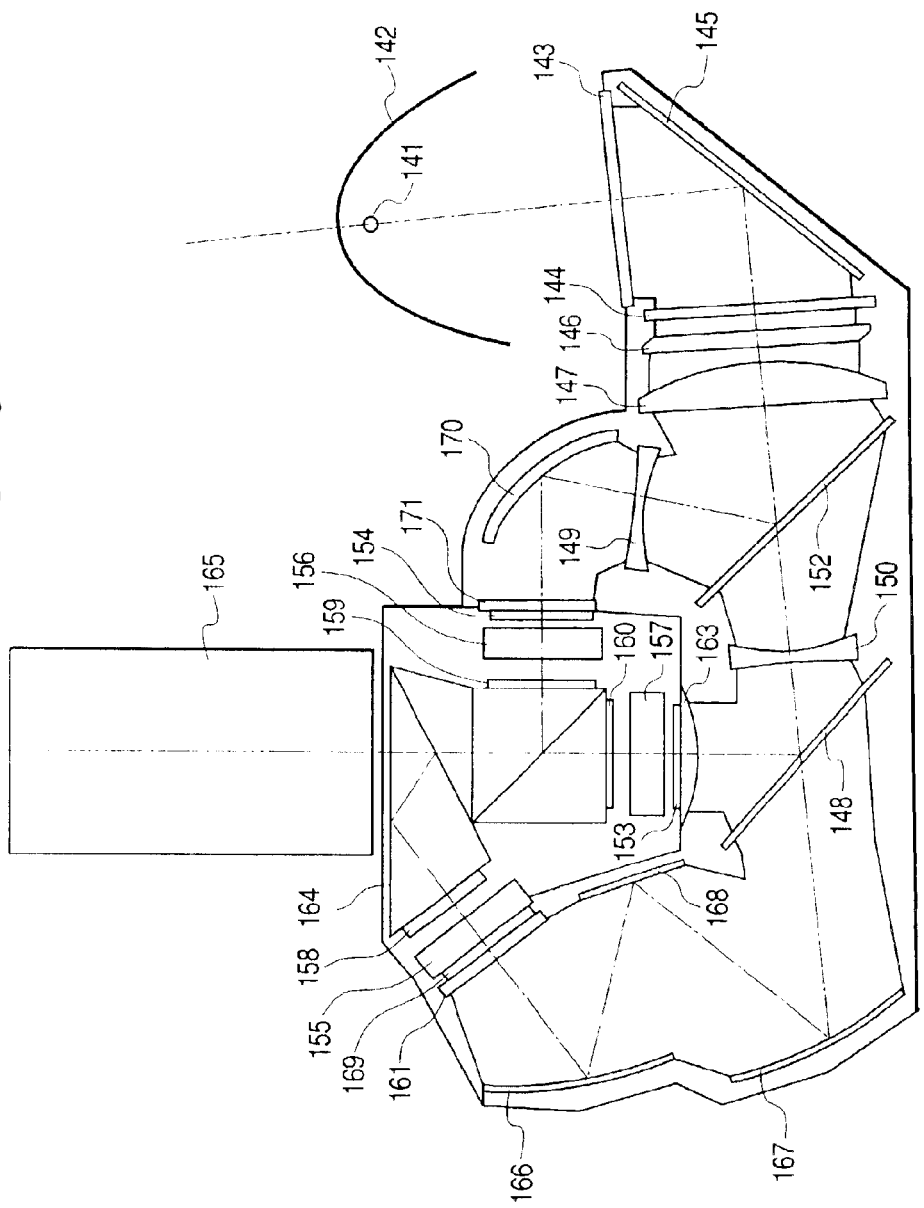
FIG. 5 is an illustration showing an optical system of a liquid crystal projector in a fourth embodiment.

FIG. 5 is an illustration showing a liquid crystal projector (projection display apparatus) as a fourth embodiment of the present invention. The same portions as the constitutive elements in FIG. 4 are denoted by the same reference symbols and the description thereof is omitted herein.

In the present embodiment, the projector is arranged in the configuration wherein the green-reflecting dichroic mirror 152 is placed on the exit side of the condenser lens 147 and the blue-reflecting dichroic mirror 148 on the transmission (exit) side of the green-reflecting dichroic mirror 152. In conjunction therewith, change (replacement) is made in the characteristics of the liquid crystal panels 156, 157, the polarizing plates 153, 154, and the dichroic films of the prism 164. Then the green light reflected by the green-reflecting dichroic mirror 152 passes through the concave lens 149, and is guided to a green-transmitting dichroic filter 171 and an entrance-side polarizing plate 154 by a free-form surface mirror 170. Here the free-form surface mirror 170 has the optical action of the field lens and thus obviates the need for the field lens for green light. Then the green-transmitting dichroic filter 171 described above is placed at the position where the field lens for green light used to be located. The green-transmitting dichroic filter 171 is arranged so that a dichroic film is deposited on one surface of a transparent substrate, for example such as a sapphire substrate, fluorite, a glass sheet, or the like, by evaporation and the polarizing plate 154 is stuck to the other surface of the transparent substrate, as the red-transmitting dichroic filter 161 is. Then the dichroic filter 171 is located so that the side of the polarizing plate 154 is positioned on the green liquid crystal panel 156 side and the side of the dichroic film on the free-form surface mirror 170 side. The heat due to the unwanted light, absorbed by the dichroic film of each dichroic filter 161, 171, is transferred to the transparent substrate to be radiated (to effect cooling) at the transparent substrate. Therefore, the heat absorbed by the dichroic films is not directly transferred to the polarizing plates 169, 154, so as to avoid the deterioration of the polarizing plates. The dichroic filters and polarizing plates are cooled by cooling air from the fan (not shown).

The present embodiment provides the configuration of the liquid crystal projector in which the polarizing plates are efficiently cooled, because the energy to be absorbed by the dichroic films is distributed into the red path and the green path and the intervening elements (transparent substrates) for promoting cooling are placed between the polarizing plates and the dichroic films.

Each of the above embodiments described the configuration in which the polarizing plate and the dichroic film (dielectric deposited film) are placed in unadjacent relation, e.g., the configuration in which the polarizing plate is stuck to one surface of the transparent substrate and the dichroic film is deposited on the other surface by evaporation. In the case where, because of the balance between luminous efficiency of the lamp and cooling efficiency, the heat of the dichroic film is not dissipated well during transfer through the intervening transparent substrate to reach the polarizing plate, it is also feasible to decrease the transfer of the heat absorbed at the dichroic film, to the polarizing plate, for example, by changing the material of the transparent substrate, by increasing the thickness of the transparent substrate, or by changing the size of the transparent substrate (or increasing the area). In general, the larger the thickness of the transparent substrate, the more advantageous to cooling. Furthermore, the larger the surface area of the transparent substrate to the area of the polarizing plate, the more advantageous to cooling. Furthermore, if the area of the transparent substrate is set greater than the area where the dichroic film is deposited, it becomes feasible to minimize the heat generated, which is advantageous to cooling. The cooling condition becomes better in configurations wherein the substrate to which the polarizing plate is stuck is made of sapphire or fluorite with higher thermal conductivity than glass.

In each of the above-stated embodiments, the heat problem of the polarizing plate is overcome by the configuration wherein the polarizing plate and the dichroic film are spaced apart from each other (or placed in unadjacent relation to each other), as described above. By the configuration wherein the glass member with the dichroic film deposited is placed at the position where principal rays are nearly parallel, except in the vicinity of the liquid crystal panel, or by the configuration wherein the free-form surface mirror is used without use of the field lens and wherein the polarizing plate and the substrate (dichroic filter) with the dichroic film deposited are placed at the position where the field lens used to be placed, it becomes feasible to avoid increase in the number of parts so as to effect space saving and to increase the cooling efficiency of the polarizing plate at the same time. By the configuration wherein the transparent substrate is interposed between the polarizing plate and the dichroic film and wherein the thickness of the transparent substrate is adjusted, it becomes feasible to change the spacing between the polarizing plate and the dichroic film, whereby the heat generated at the dichroic film is effectively radiated by the transparent substrate, so as to implement the cooling of the polarizing plate.

(Fifth Embodiment)

Figure 6:
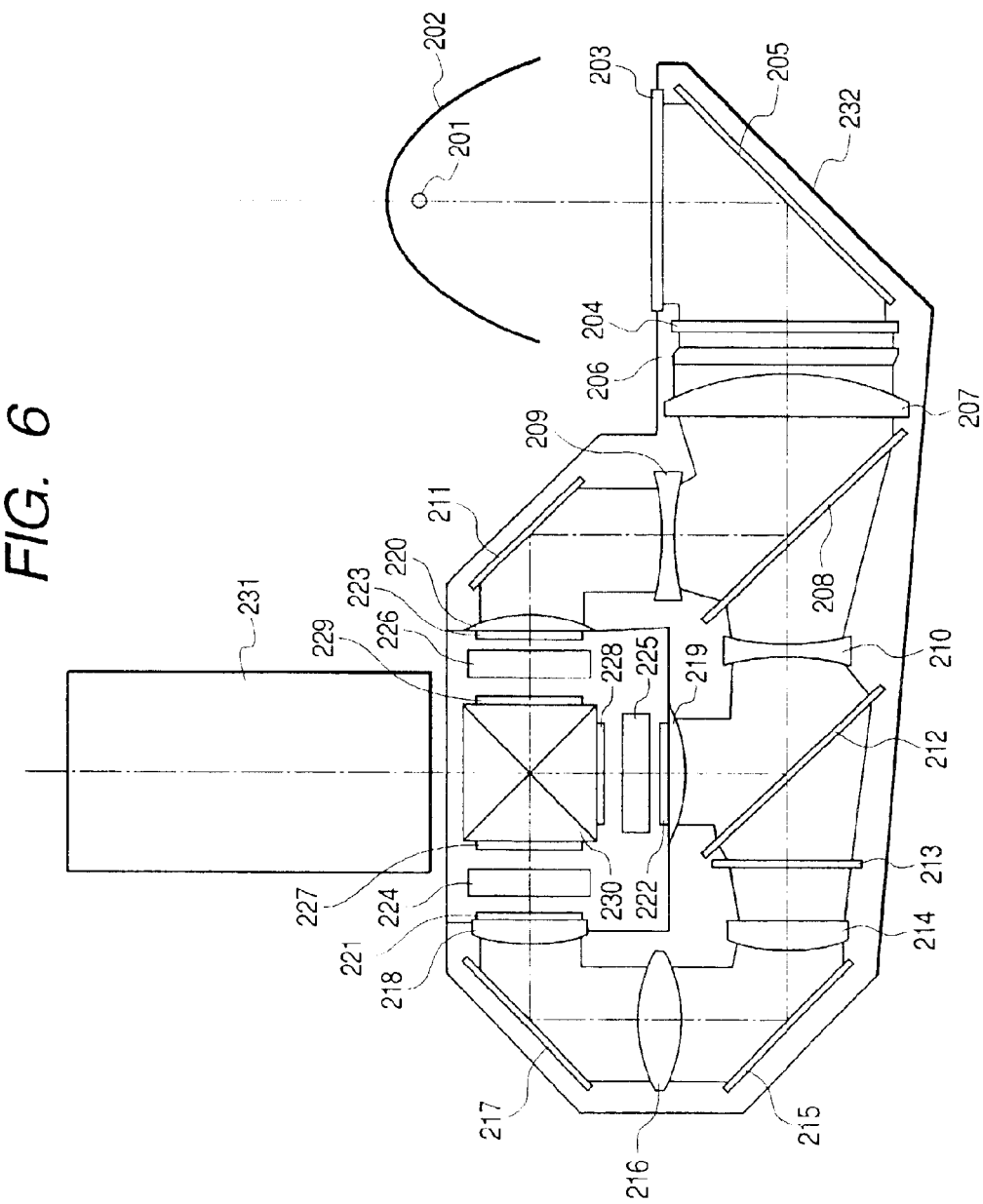
FIG. 6 is an illustration showing an optical system of a liquid crystal projector in a fifth embodiment.

FIG. 6 shows a configuration of an optical system in a liquid crystal projector (projection image display apparatus) as a fifth embodiment of the present invention. Reference numeral 201 designates a light source, which is comprised, for example, of a high-intensity extra-high pressure lamp, a metal halide lamp, or the like. Beams emerging from the light source 201 travel directly into a first fly's eye lens 203, which is an ensemble of lenses arranged in a grid pattern, or are reflected by a reflector 202 to enter the first fly's eye lens 203.

The beams divided by the first fly's eye lens 203 are reflected by a reflective mirror 205 and are condensed by a second fly's eye lens 204. The condensed beams are incident into a polarization changer 206 to be aligned into a polarization orientation, and are further condensed by a condenser lens 207.

The beams condensed by the condenser lens 207 are guided to a blue-reflecting dichroic mirror 208, which reflects light in the blue frequency band (hereinafter referred to as blue light). The dichroic mirror 208 separates the blue light from the beams. The blue light travels through a concave lens 209 having the effect of shortening the path length, is reflected by a reflective mirror 211, and then travels through a field lens 220 and an entrance-side polarizing plate 223 to reach a blue liquid crystal panel 226.

The light having passed through the blue-reflecting dichroic mirror 208 then passes through a concave lens 210 and is separated into green light and red light by a green-reflecting dichroic mirror 212, which reflects light in the green frequency band (hereinafter referred to as green light). The green light reflected by the green-reflecting dichroic mirror 212 travels through a field lens 219 and an entrance-side polarizing plate 222 to reach a blue liquid crystal panel 225.

Furthermore, light in the red frequency band (hereinafter referred to as red light), having passed through the green-reflecting dichroic mirror 212, then passes through a red-transmitting dichroic filter 213, which removes an unwanted component from the red light. Thereafter, the red light passes via a field lens 214, a reflective mirror 215, a relay lens 216, a reflective mirror 217, and a field lens 218 and then passes through a red entrance-side polarizing plate 221 to reach a red liquid crystal panel 224.

The light reaching each liquid crystal panel 224, 225, 226 is modulated according to an image signal fed from an unrepresented image information supply, such as a personal computer, a video cassette recorder, a DVD player, or the like, in the liquid crystal panel. Thereafter, the light thus modulated exits the liquid crystal panel 224, 225, 226, and passes through an exit-side polarizing plate 227, 228, 229. Then the three color spectrums are combined by a cross prism 230 with evaporated dichroic films. Furthermore, the light exiting the cross prism 230 is enlarged and projected onto an unrepresented screen by a projection lens 231.

Numeral 232 denotes an optical box (case) which houses the image display optical system from the first fly's eye lens 203 to the cross prism 230.

Figure 7:
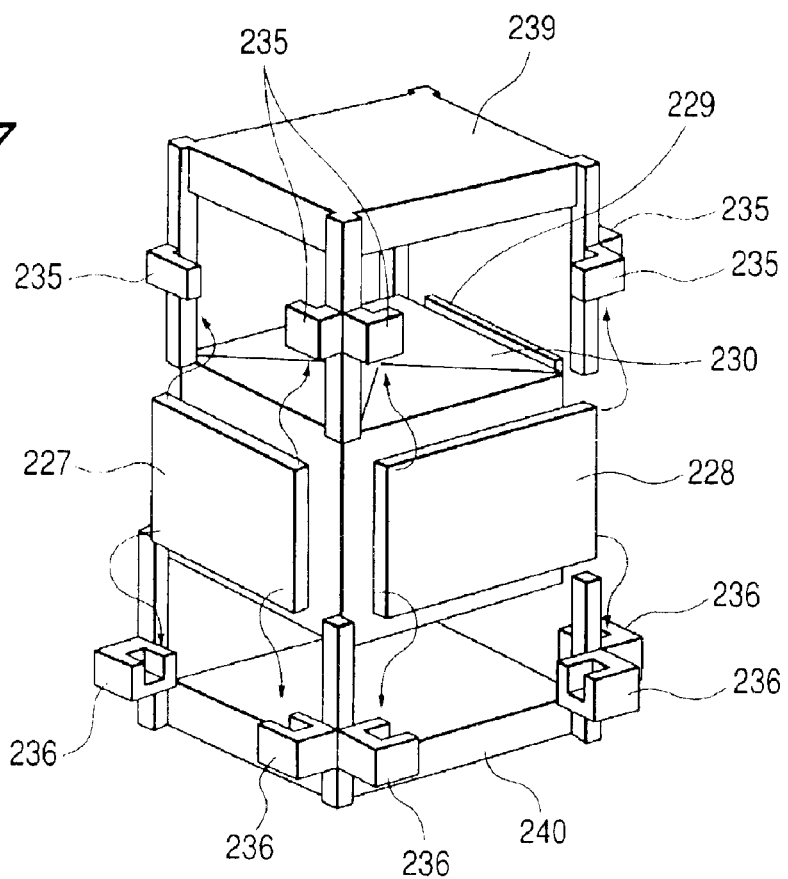
FIG. 7 is an exploded perspective view of a prism and a prism seat in the liquid crystal projector of the fifth embodiment.

Now the configuration around the cross prism 230 will be described referring to FIGS. 6, 7, and 8. Since the liquid crystal panels 224, 225, 226 for the respective color spectrums need to be fixed at the focal position of the projection lens 231 (FIG. 6), as shown in FIGS. 7 and 8, a unit consisting of the cross prism 230, the exit-side polarizing plates 227, 228, 229, and the liquid crystal panels 224, 225, 226 is arranged detachable from the optical box 232 (FIG. 6).

Figure 8:
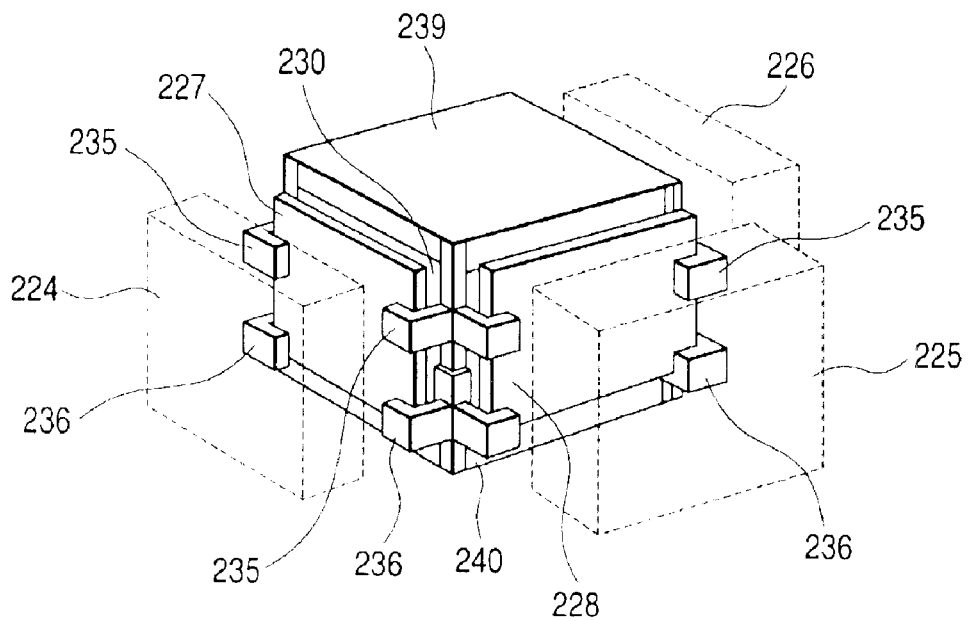
FIG. 8 is a perspective view of the prism and the prism seat in the liquid crystal projector of the fifth embodiment.

In FIG. 8, the liquid crystal panels 224, 225, 226 indicated by dashed lines in the figure are fixed at the focal position of the projection lens 231 (FIG. 6). In order to accurately hold the polarizing plates 227, 228, (229 not shown) relative to the cross prism 230, a prism seat (support member) is provided with portions for holding the polarizing plates 227, 228, 229 (holding portions).

As shown in FIG. 8, the prism seat is configured to function in combination of two pieces of upper and lower seats 239, 240, and each of the upper and lower seats 239, 240 is comprised of a plane portion constituting a bottom surface or a top surface, and column portions extending upward or downward from the four corners of the plane portion.

The holding portions 235, 236 for holding the polarizing plates 227, 228, 229 are integrally formed on the column portions of the upper and lower seats 239, 240 of the prism seat. The upper and lower seats 239, 240 are fixed to the prism 230 with an adhesive or the like.

Among the holding portions integrally formed in the prism seat in this way, the holding portions 236 provided in the lower seats 240 are adapted to hold the lower corners of the polarizing plates 227, 228, 229 to position the polarizing plates 227, 228, 229 in the light incidence direction and in the opposite direction thereto, and in the vertical directions. The holding portions 235 provided in the upper seat 239 serve as guides for the polarizing plates 227, 228, 229 to be inserted into the holding portions 236 provided in the lower seat 240, and are adapted to hold the upper portions of the polarizing plates 227, 228, 229 in the vicinity of the side edges thereof to position the polarizing plates 227, 228, 229 in the light incidence direction and in the opposite direction thereto.

After the polarizing plates 227, 228, 229 are inserted into the holding portions 235, 236, these polarizing plates are bonded and fixed to the holding portions 235, 236. It is, however, also possible to employ a configuration in which the polarizing plates are fixed to the holding portions 235, 236 by means of separate metal plates for keeping the polarizing plates. As described above, the present embodiment provides the configuration in which each of the polarizing plates 227, 228, 229 is able to be stably held by the combination of the upper and lower seats 239, 240.

It is also possible to employ a configuration wherein only either one of the upper and lower seats of the prism seat is provided with the holding portions for holding the polarizing plates, but the present embodiment adopts the configuration in which the prism seat is divided into the upper and lower seats 239, 240 in order to avoid a need for a complicated die structure in a forming operation by injection molding or die-casting.

The present embodiment described the example where the exit-side polarizing plates were held by the holding portions of the prism seat, but the present invention does not have to be limited to this example. For example, the holding portions may also be arranged to hold, for example, wave plates or phase plates for changing the direction of polarization or the phase difference, liquid crystal filters for improving viewing angle characteristics of liquid crystals, or the like.

The present embodiment described the example of use of the cross prism, but the present invention also allows use of a so-called 4P prism or 3P prism.

(Sixth Embodiment)

Figure 9:
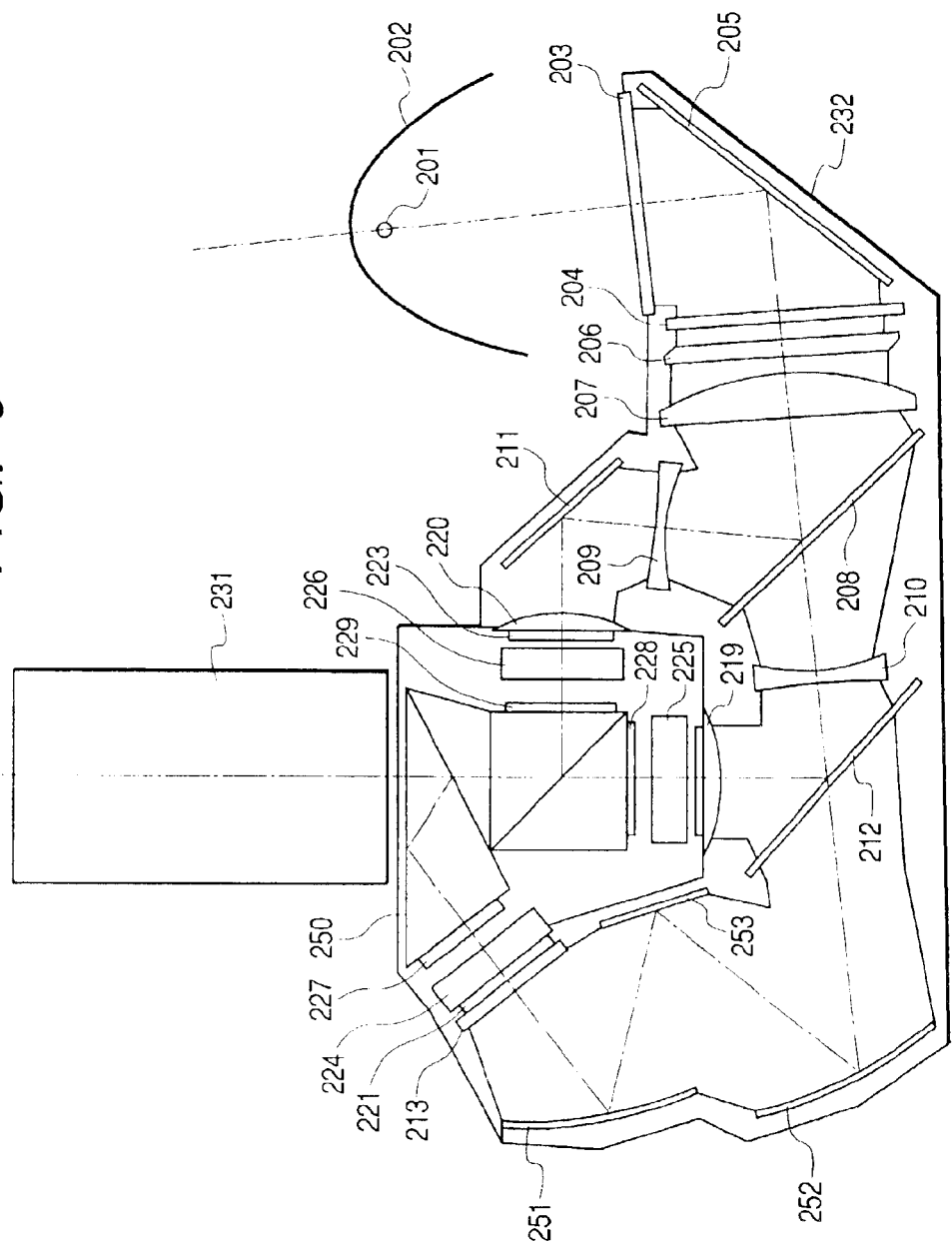
FIG. 9 is an illustration showing an optical system of a liquid crystal projector in a sixth embodiment.

FIG. 9 shows a configuration of an optical system in a liquid crystal projector (projection image display apparatus) as a sixth embodiment of the present invention. The optical system of the present embodiment has the structure that is substantially the same as the optical system of the fifth embodiment, but it is constructed using a 4-piece (hereinafter referred to as 4P) prism as a prism for color combining. In the present embodiment, the relay lens system is replaced by free-form surface mirrors 251, 252 and a concave mirror 253, which are formed in portions facing the optical path of red light in the internal surfaces of the optical box 232.

The constitutive elements in the present embodiment common to the fifth embodiment are denoted by the same reference symbols as in the fifth embodiment.

Among the beams emitted from the light source 201, the red light, having passed through the green-reflecting dichroic mirror 212, is reflected by the free-form surface mirror 252, is then reflected by the concave mirror 253 disposed on the opposite side, is further reflected by the free-form surface mirror 251, and then travels through the red-transmitting dichroic filter 213 and the entrance-side polarizing plate 221 to reach the red liquid crystal panel 224.

The color spectrums modulated by the respective liquid crystal panels 224, 225, 226 travel through the corresponding exit-side polarizing plates 227, 228, 229 to enter the 4P prism 250. Then the three color spectrums are combined by the action of dichroic films in the 4P prism 250, and the combined light is enlarged and projected onto the screen by the projection lens 231.

In the optical system constructed in this structure, the prism seat described in the fifth embodiment is also used to hold the exit-side polarizing plates by the holding portions integrally formed in the prism seat.

The present embodiment described the configuration wherein the exit-side polarizing plates were held by the holding portions in the prism seat, but the present invention does not have to be limited to this example. For example, it is also possible to arrange the prism seat so that the holding portions hold the wave plates or phase plates for changing the polarization direction or the phase difference, the liquid crystal filters for improving the viewing angle characteristics of liquid crystals, or the like.

The present embodiment described the example of use of the 4P prism, but the present invention also allows use of the so-called cross prism or 3P prism.

(Seventh Embodiment)

FIG. 10 shows a seventh embodiment of the present invention. The holding portions provided in the prism seat described in the fifth embodiment were arranged in the configuration wherein the optical members such as the polarizing plates or the like were inserted thereinto, whereas the present embodiment describes a configuration wherein the prism seat is made by plastic molding and the optical members are held by making use of elasticity of the prism seat itself.

As shown in FIG. 10, the holding portions 355, 356 of claw shape are integrally formed with columnar portions of upper and lower seats 352, 354 of the prism seat, and the holding portions 355, 356 are forced toward the entrance side of the prism by elasticity, whereby the polarizing plate 228 is held in a pinched state between the holding portions 355, 356 and the columnar portions.

Each lower holding portion 356 has a contact surface to the lower corner of the polarizing plate 228 and prevents a downward fall of the polarizing plate 228. In the upper seat 352, a fall preventing portion 357, which is adapted to contact the upper end face of the polarizing plate 228 to prevent an upward fall, is integrally formed.

In an operation of making the polarizing plate 228 held, the lower portion of the polarizing plate 228 is first obliquely inserted into between the lower holding portions 356 and the columnar portions and the polarizing plate 228 is then pushed toward the entrance surface of the prism. This results in urging the back face of the polarizing plate 228 against a slant face of each upper holding portion 355. The holding portions 355 undergo elastic deformation to open, whereby the polarizing plate 228 is brought into close fit with the columnar portions. At this time, the holding portions 355 tend to return to their original position by the elasticity, so that the polarizing plate 228 is fixed and held to the prism by biasing forces of the holding portions.

The present embodiment described the example wherein the exit-side polarizing plates were held by the holding portions of the prism seat, but the present invention does not have to be limited to this example. For example, the holding portions may also be arranged to hold the wave plates or the phase plates for changing the polarization direction or the phase difference, the liquid crystal filters for improving the viewing angle characteristics of liquid crystals, or the like.

(Eighth Embodiment)

Figure 12:
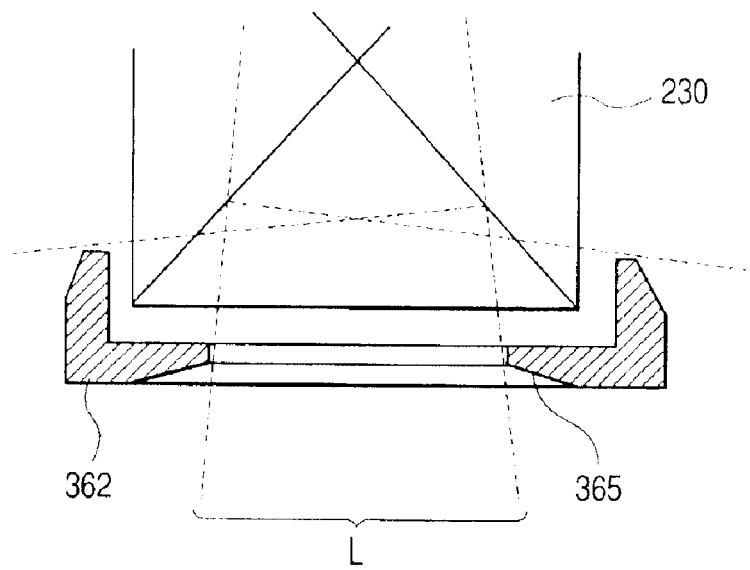
FIG. 12 is an illustration showing the prism and the prism seat in the liquid crystal projector of the eighth embodiment.

FIGS. 11A, 11B, and 12 show an eighth embodiment of the present invention. The above fifth to seventh embodiments described the examples wherein the holding portions for holding the optical members were integrally formed in the prism seat, whereas the present embodiment describes an example wherein field stop portions (shielding portions) are integrally formed in the prism seat.

In FIGS. 11A, 11B, and 12, the field stop portions 365, 366 are integrally formed around light passing ports, facing to the entrance face and exit face of the prism 230, in the upper seat 362 and the lower seat 364 of the prism seat.

When the prism seat (upper and lower seats 362, 364) of this configuration is fixed to the prism 230, a mask shape to block entrance of unwanted rays into the prism 230 and exit of unwanted rays from the prism 230 is provided in contiguity with the entrance face and exit face of the prism.

When the upper and lower seats 362, 364 are fabricated by injection molding of plastic resin, the distal ends of the field stop portions slightly expand with heat, so that it is necessary to provide a clearance 363 (as shown in FIG. 11B) between the distal ends of the columnar portions of the upper and lower seats 362, 364 in consideration of the coefficient of linear expansion of the resin.

This configuration is able to prevent undesired stress from being applied to the bond surfaces between the prism 230 and the upper and lower seats 362, 364 even with thermal expansion of the upper and lower seats 362, 364.

As shown in FIG. 12, the field stop portions 362 are formed outside the effective beam range L. Therefore, it is feasible to prevent light from entering the prism 230 in the region outside the effective beams to produce ghost or the like.

The provision of the field stop portions in the prism seat is advantageous in that the position accuracy of the field stop portions is better and the number of parts is smaller than in the configuration wherein shielding members are mounted on the prism seat.

The present embodiment described the example of use of the cross prism 230, but the present invention also allows use of the 4P prism or the 3P prism.

(Ninth Embodiment)

Figure 13:
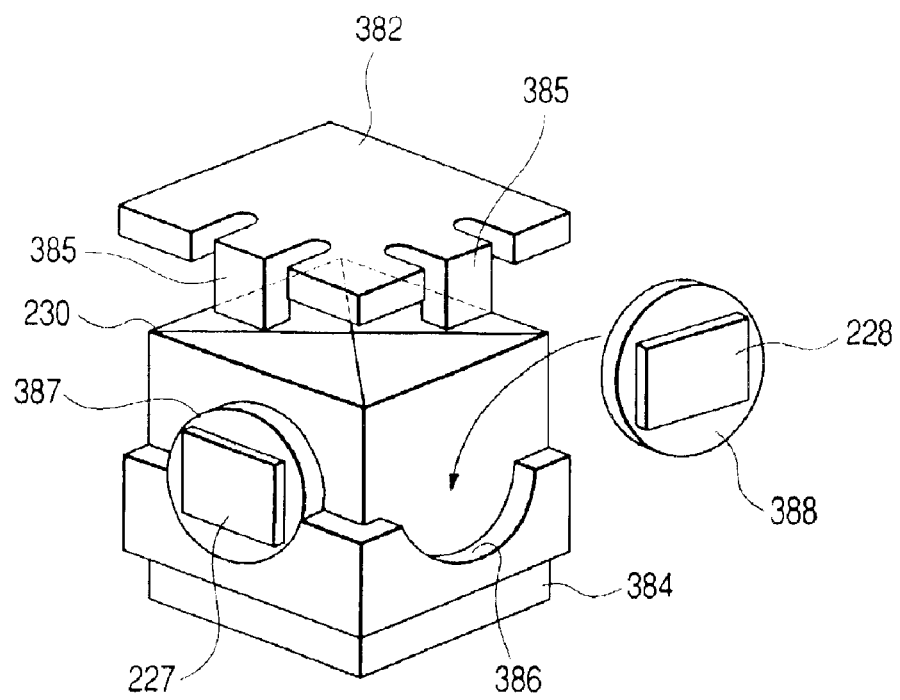
FIG. 13 is a perspective view of a prism and a prism seat in a liquid crystal projector of a ninth embodiment.

FIG. 13 shows a ninth embodiment of the present invention. In the present embodiment, the upper and lower seats 382, 384 of the prism seat are shaped so as to hold lenses (field lenses) 387, 388 like a lens barrel. The present embodiment is effective, for example, in the case where some lenses of the projection lens have to be located in the optical paths of green, blue, and red.

When lenses with different radii of curvature are placed in the optical paths of the respective color spectrums, it is feasible to eliminate the optical aberration such as chromatic aberration of magnification or the like. FIG. 13 omits the illustration of the lens in the blue path.

The exit-side polarizing plates 227, 228 are bonded to the front surfaces of the lenses 387, 388, the lenses 387, 388 are rotatably held in semicircular holding portions 386 provided in the lower seat 384, and the upper seat 382 is provided with lens fall preventing portions 385.

In this configuration, where the upper and lower seats 382, 384 are formed of resin, the seat is also affected by linear expansion, as in the eighth embodiment, and it is thus necessary to fabricate the seat under setting of dimensions taking account of the linear expansion; or the seat with little dimensional change has to be made by die-casting.

When the lenses 387, 388 with the polarizing plates 227, 228 bonded thereto are rotated, it is feasible to finely adjust the transmission axis of polarization of the exit-side polarizers 227, 228 relative to the liquid crystal panels, whereby the contrast of the projected image can be enhanced more.

The present embodiment described the example of use of the cross prism 230, but the present invention also allows use of the 4P prism or the 3P prism.

(Tenth Embodiment)

Figure 14:
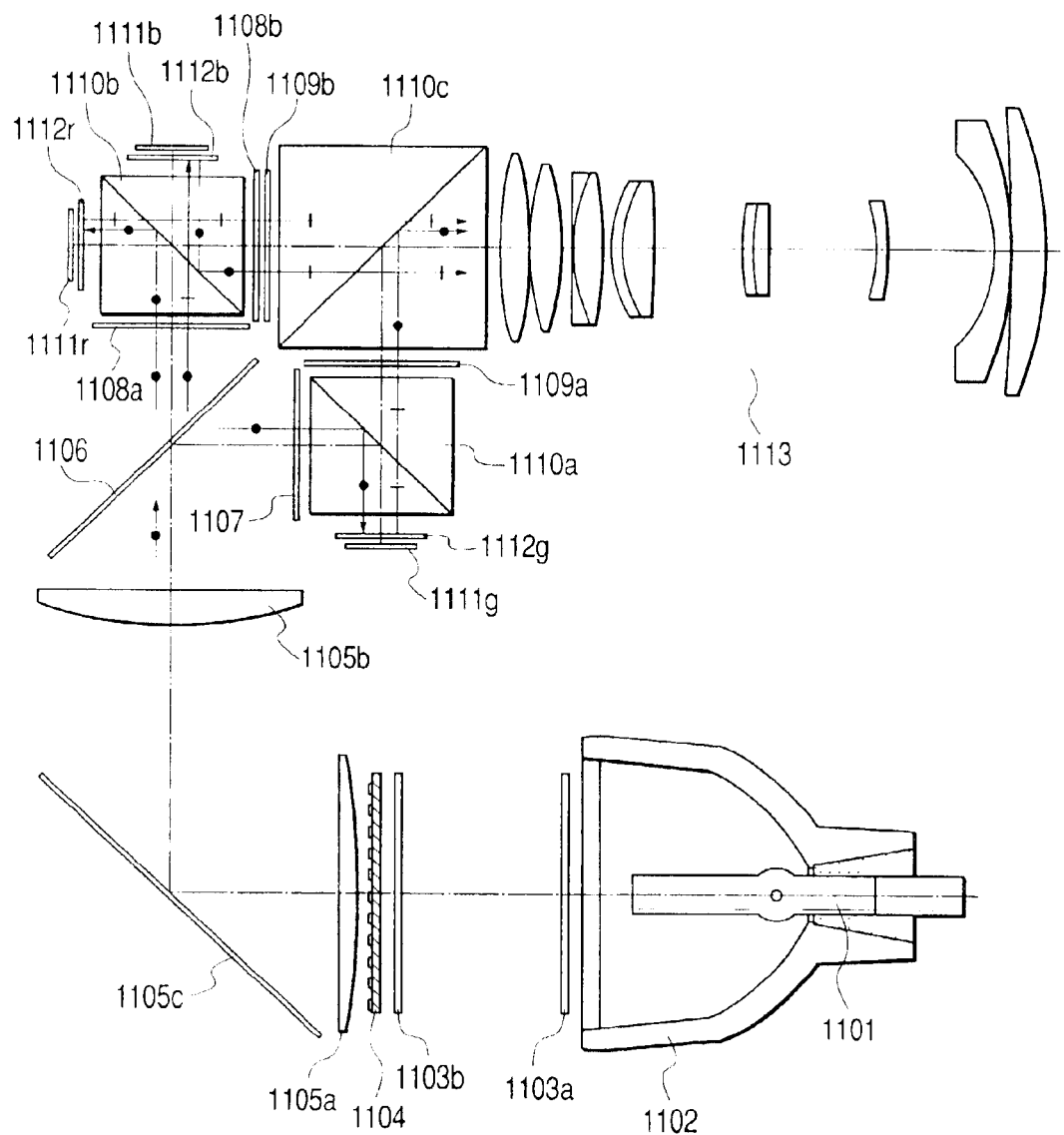
FIG. 14 is an illustration showing an optical system of a liquid crystal projector in a tenth embodiment.

FIG. 14 shows a configuration of an optical system in a liquid crystal projector (projection image display apparatus) as a tenth embodiment of the present invention. In the drawing, reference numeral 1101 designates a light source which emits a continuous spectrum of white light; 1102 a reflector which collects light into a predetermined direction; 1103a a first fly's eye lens in which rectangular lenses are arranged in a matrix pattern; 1103b a second fly's eye lens which is comprised of an array of lenses corresponding to the individual lenses of the first fly's eye lens; 1104 a polarization changer which aligns unpolarized light into predetermined polarized light.

Reference symbol 1105a represents a condenser lens, 1105b a field lens, and 1105c a reflective mirror.

Numeral 1106 indicates a dichroic mirror which transmits light in the wavelength regions of blue (B) and red (R) and reflects light in the wavelength region of green (G); and 1107 a color filter which cuts part of the light in the intermediate wavelength region between G and R.

Symbols 1108a, 1108b denote first and second color-selective retardation films which change the direction of polarization of the B light by 90° but do not change the direction of polarization of the R light.

Symbols 1109a, 1109b are first and second half wave plates.

Symbols 1110a, 1110b, 1110c denote first, second, and third polarizing beam splitters, respectively, of prism shape which transmit P polarized light but reflect S polarized light.

Symbols 1111r, 1111g, 1111b are red, green, and blue reflective liquid crystal display elements, respectively, which reflect incident light and display respective images for image modulation of the incident light.

Symbols 1112r, 1112g, 1112b represent red, green, and blue quarter wave plates, respectively. Numeral 1113 indicates a projection lens.

The optical action in this liquid crystal projector will be described below. The light emitted from the light source 1101 is collected into the predetermined direction by the reflector 1102. The reflector 1102 herein is of the parabolic shape, so that the light from the focal position of the parabolic surface is beams parallel to the symmetry axis of the parabolic surface. However, since the light source 1101 is not an ideal point source but has a finite size, the collected light includes a lot of components of light that are not parallel to the symmetry axis of the parabolic surface.

These collected beams are incident into the first fly's eye lens 1103a. The first fly's eye lens 1103a is constructed of a matrix-like combination of lenses each having the rectangular contour and a positive refracting power. The incident beams are divided into a plurality of beams according to the respective lenses, and are condensed, and the beams pass through the second fly's eye lens 1103b to form a plurality of light source images in a matrix pattern in the vicinity of the polarization changer 1104.

The polarization changer 1104 is comprised of polarization separating surfaces, reflective surfaces, and a half wave plate. The plurality of beams condensed in the matrix pattern are incident to the polarization separating surfaces corresponding to respective columns of the beams to be divided into light of the P polarization component transmitted and light of the S polarization component reflected.

The light of the S polarization component reflected is reflected on the reflective surfaces and emerges in the same direction as the P polarization component. On the other hand, the light of the P polarization component transmitted passes through the half wave plate to be converted into the same polarization component as the S polarization component. As a result, the light of the two components exits as light aligned in the polarization direction (·).

The plurality of polarization-converted beams are condensed in the vicinity of the polarization changer 1104 and thereafter travel as diverging beams up to a condensing optical system. The condensing optical system consists of the condenser lens 1105*a* and the field lens 1105*b*, and the beams are superposed by the condensing action, at the position where images of the rectangular shape of the individual lenses in the fly's eye lens are formed, thus forming a uniform rectangular illumination area.

In the optical path from the field lens 1105*b* to the reflective liquid crystal display elements 1111*r*, 1111*g*, 1111*b*, the light to be focused on the reflective liquid crystal display elements is set so as to be approximately telecentric relative to the optical axis of the condensing optical system, whereby variation in characteristics due to incident angles at the optical thin films of the dichroic mirror 1106 and the polarizing beam splitters 1110*a*, 1110*b* is prevented from appearing as images on the reflective liquid crystal display elements.

The dichroic mirror 1106 has such characteristics as to transmit the light of B and R but reflect the light of G.

In FIG. 14, the light of the S polarization in the polarization changer 1104 is also S polarized light (·) for the dichroic mirror 1106.

In the optical path of G, the light reflected by the dichroic mirror 1106 is incident into the color filter 1107. The color filter 1107 is comprised of a dichroic filter that reflects the color light of yellow in the intermediate wavelength region between G and R, and functions to remove the yellow light from the green light. The reason for it is as follows: if the green light includes a lot of the color component of yellow the green light will appear yellowish green, and it is thus desirable to remove the yellow light in terms of color reproduction.

The color filter 1107 may be one having such characteristics as to absorb the yellow light.

The light adjusted in color in this way is incident as S polarized light (·) into the first polarizing beam splitter 1110*a* to be reflected on its polarization separating surface, and the reflected light travels to the G reflective liquid crystal display element 1111*g*. At the G reflective liquid crystal display element 1111*g*, the G light is modulated according to an image and is reflected. The S polarization component (·) of the reflected G light thus modulated is reflected again on the polarization separating surface to be guided to the light source side to be removed from projected light.

The P polarization component (|) of the reflected G light modulated travels through the polarization separating surface to become projected light. At this time, in a state in which all the polarization components are converted into the S polarized light (in a black display state), the slow axis of the quarter wave plate 1112*g*, which is disposed between the first polarizing beam splitter 1110*a* and the G reflective liquid crystal display element 1111*g*, is adjusted into a predetermined direction, so as to keep down influence of disturbance of polarization states caused in the first polarizing beam splitter 1110*a* and the G reflective liquid crystal display element 1111*g*.

The light (|) passing through the first polarizing beam splitter 1110*a* is changed by the first half wave plate 1109*a* with the slow axis set at 45° relative to the polarization direction so that the direction of polarization is rotated by 90°, and thus it is incident as S polarized light (·) into the third polarizing beam splitter 1110*c* to be reflected on its polarization separating surface and reach the projection lens 1113.

When the slow axis of the first half wave plate 1109*a* is arranged so as to be rotatably adjustable, it is feasible to adjust the polarization direction of the G light incident to the polarization separating surface of the third polarizing beam splitter 1110*c*. For example, if there is a relative inclination between the polarization separating surface of the first polarizing beam splitter 1110*a* and the polarization separating surface of the third polarizing beam splitter 1110*c* because of mounting errors or the like, this adjusting mechanism can be used to minimize leakage of non-projected light in the third polarizing beam splitter 1110*c*, thereby enabling image adjustment of black display in G.

The light of R and B transmitted by the dichroic mirror 1106 is incident into the first color-selective retardation film 1108*a*. The first color-selective retardation film 1108*a* has the function of rotating the polarization direction of only the B light by 90°, whereby the B light is incident as P polarized light (|) while the R light is incident as S polarized light (·) into the second polarizing beam splitter 1110*b*. For this reason, in the second polarizing beam splitter 1110*b*, the B light passes through the polarization separating surface to reach the B reflective liquid crystal display element 1111*b* and the R light is reflected on the polarization separating surface to reach the R reflective liquid crystal display element 1111*r*.

At the B reflective liquid crystal display element 1111*b*, the B light is modulated according to an image and is reflected. The P polarization component (|) of the reflected B light thus modulated again passes through the polarization separating surface to be guided to the light source side and removed from the projected light. The S polarization component (·) of the reflected B light modulated is reflected on the polarization separating surface to become projected light.

Likewise, at the R reflective liquid crystal display element 1111*r*, the R light is modulated according to an image and is reflected. The S polarization component (·) of the reflected R light thus modulated is again reflected on the polarization separating surface to be guided to the light source side and removed from the projected light. The P polarization component (|) of the reflected R light modulated passes through the polarization separating surface to become projected light. This results in combining the reflected B and R light into one beam.

At this time, the slow axes of the quarter wave plates 1112*r*, 1112*b*, which are disposed between the second polarizing beam splitter 1110*b* and the R or B reflective liquid crystal display element 1111*r*, 1111*b*, are adjusted as in the case of G, so as to implement adjustment of black display for each of R and B.

The projected light of R and B combined is then incident into the second color-selective retardation film 1108*b*. The second color-selective retardation film 1108*b* is the same as the first color-selective retardation film 1108*a*, to rotate only the polarization direction of B by 90°. This configuration makes the light of R and B both incident as P polarized light (|) into the third polarizing beam splitter 1110*c*, so that they pass through the polarization separating surface to be combined with the projected light of G.

Here the second half wave plate 1109*b* is placed between the second color-selective retardation film 1108*b* and the third polarizing beam splitter 1110*c*, the slow axis of the second half wave plate 1109*b* is directed in the same direction (in the direction not to change the polarization state) as the direction of transmitted polarization, and the inclination of the slow axis of the second half wave plate 1109*b* is adjusted in much the same manner as in the case of G. This results in adjusting the polarization direction of the R and B light so as to be properly incident to the polarization separating surface of the third polarizing beam splitter 1110c, which minimizes leakage of non-projected light in the third polarizing beam splitter 1110c, thereby enabling image adjustment of black display in R and B.

The projected light of R, G, and B combined is then projected onto the screen or the like by the projection lens 1113.

In the present embodiment, a boundary surface between each optical element and air is coated with an antireflection coating; each surface transmitting only the G light is provided with an antireflection coating whose wavelength band with the lowest reflectance is set in the vicinity of 550 nm; each surface transmitting only the R light is provided with an antireflection coating whose wavelength band with the lowest reflectance is set in the vicinity of 610 nm; each surface transmitting only the B light is provided with an antireflection coating whose wavelength band with the lowest reflectance is set in the vicinity of 450 nm. In addition, each surface transmitting the light of R and B is provided with an antireflection coating having two wavelength bands with lowered reflectances in the vicinity of 450 nm and in the vicinity of 610 nm.

Fno of the projection lens 1113 is set brighter than Fno of the illumination system in consideration of deviation between the optical axis of the projection lens 1113 and the optical axis of the condensing optical system due to diffraction at the reflective liquid crystal display elements and mounting errors.

Figure 15:
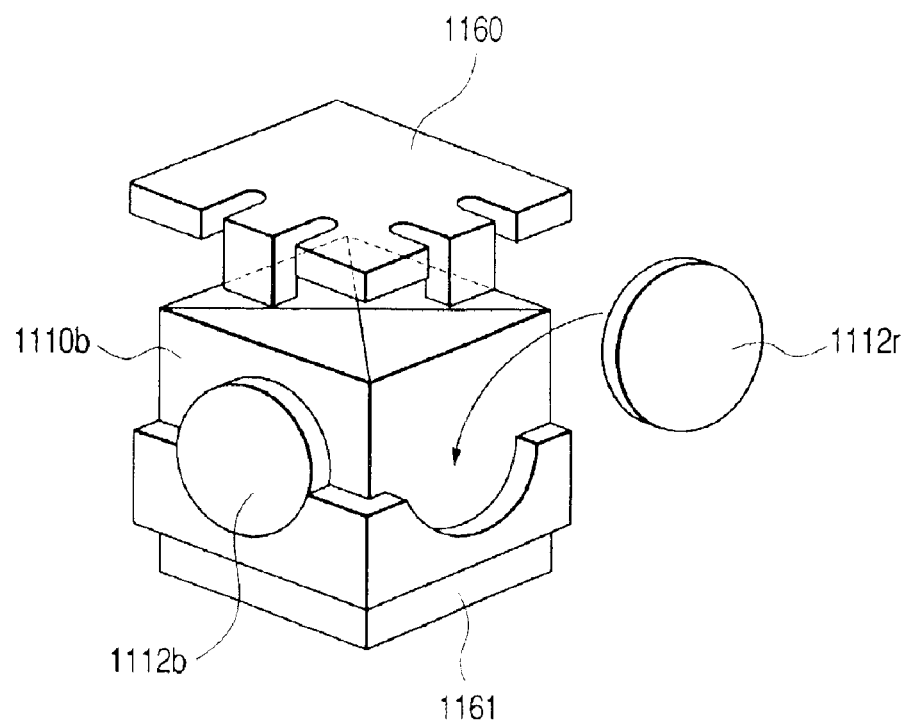
FIG. 15 is a perspective view of a prism and a prism seat in the liquid crystal projector of the tenth embodiment.

In the present embodiment, as shown in FIG. 15, portions for rotatably holding the quarter wave plates 1112r, 1112b are integrally formed in a prism seat (support member) 1160, 1161 holding the second polarizing beam splitter 1110b.

Figure 16:
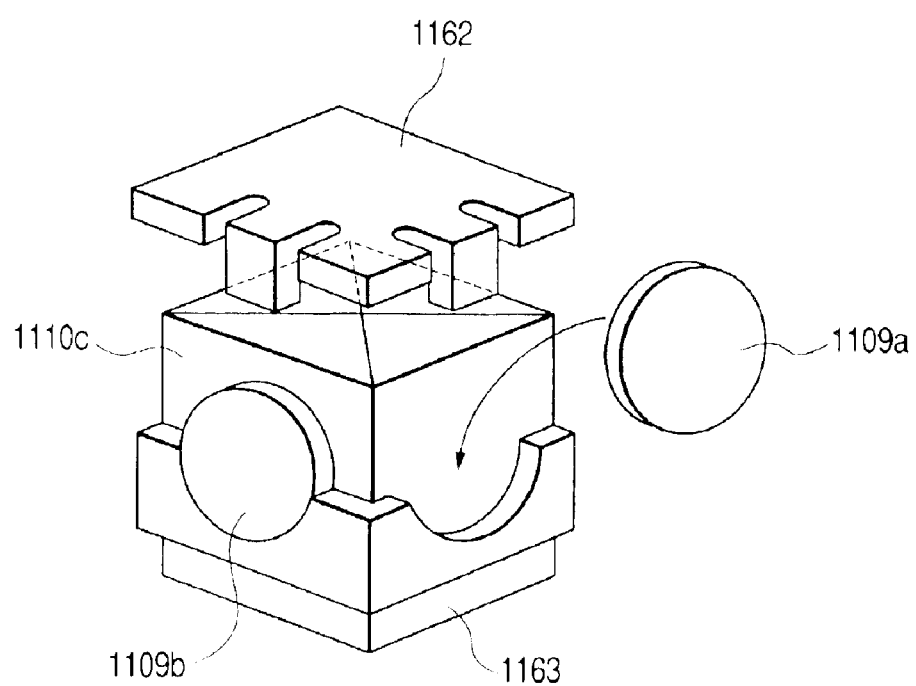
FIG. 16 is a perspective view of a prism and a prism seat in the liquid crystal projector of the tenth embodiment.

In addition, as shown in FIG. 16, portions for rotatably holding the half wave plates 1109a, 1109b are integrally formed in a prism seat (support member) 1162, 1163 holding the third polarizing beam splitter 1110c.

Although not illustrated, portions for rotatably holding the quarter wave plate 1112g are also integrally formed in a prism seat (support member) which holds the first polarizing beam splitter 1110a shown in FIG. 14.

When the half wave plate or the quarter wave plate held by each prism seat is rotatably adjusted to rotate and finely adjust the slow axis as a crystallographic axis with respect to the transmission axis of the polarizing plate, the contrast can be enhanced.

The polarizing beam splitters are bonded and fixed to the prism seats, and the prism seats may be made of a material of polycarbonate or die-cast aluminum. Likewise, in order to accurately fix and support the color-selective retardation films 1108a, 1108b or the color filter 1107, holding portions for holding them may also be integrally formed in the prism seats.

It is also possible to employ a configuration wherein one prism seat holds the three polarizing beam splitters 1110a, 1110b, 1110c together. In this configuration, portions for holding the half wave plates, quarter wave plates, color-selective retardation films, and color filter may also be integrally formed in the prism seat.

(Eleventh Embodiment)

FIGS. 17A–17D show configurations around the color separating system or the color combining system in a liquid crystal projector (projection image display apparatus) as an eleventh embodiment of the present invention.

Figure 17A:
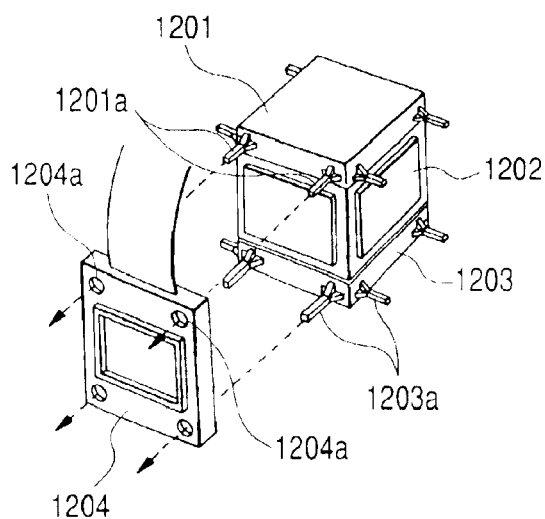
FIGS. 17A, 17B, 17C, and 17D are perspective views of examples of the prism and prism seat in a liquid crystal projector of an eleventh embodiment.

In FIG. 17A, a prism (a cross prism, a polarizing beam splitter, or the like) 1202 is positioned on positioning portions (not shown) of upper seat 1201 and lower seat 1203, and the upper seat 1201 and lower seat 1203 are bonded to the prism 1202 with an adhesive (an ultraviolet-curing adhesive, an epoxy adhesive, or the like).

In the upper seat 1201 and the lower seat 1203, holding pin forming portions 1201a, 1203a for holding the liquid crystal panel (image display element) 1204 are integrally formed, and the lower seat 1203 is provided with positioning mechanism and mounting portions (not shown) for mounting the unit on an illumination optical box.

On the other hand, holes 1204a for the above holding pin forming portions 1201a, 1203a to be inserted into are formed in the liquid crystal panel 1204. Although omitted from the illustration, such holding pin forming portions and holes on the liquid crystal panel side are also formed similarly for holding each of the liquid crystal panels of green, blue, and red.

Figure 17B:
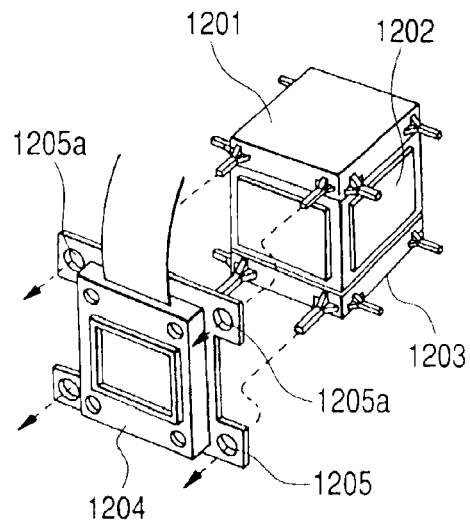

FIG. 17B shows a configuration wherein the liquid crystal panel 1204 is screwed (not shown) to a metal plate 1205 and wherein the holding pin forming portions 1201a, 1203a integrally formed in the upper seat 1201 and in the lower seat 1203 are inserted into the holes 1205a formed in the metal plate 1205. This configuration permits position adjustment of the liquid crystal panel 1204 relative to the prism 1202 by loosening the screws, which screw the liquid crystal panel 1204 to the metal plate 1205, while the metal plate 1205 is fixed to the prism seat.

Figure 17C:
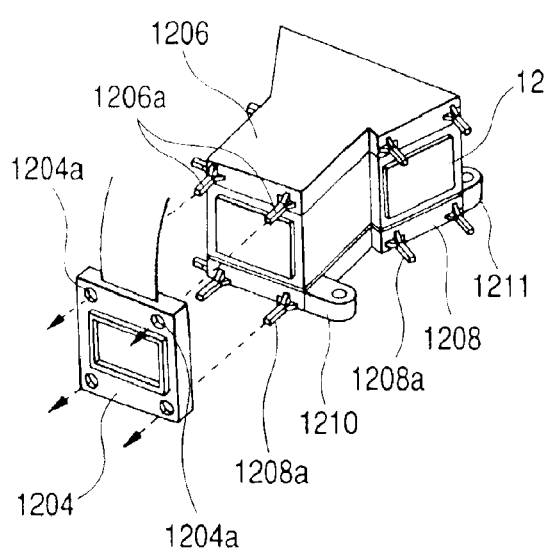
Figure 17D:
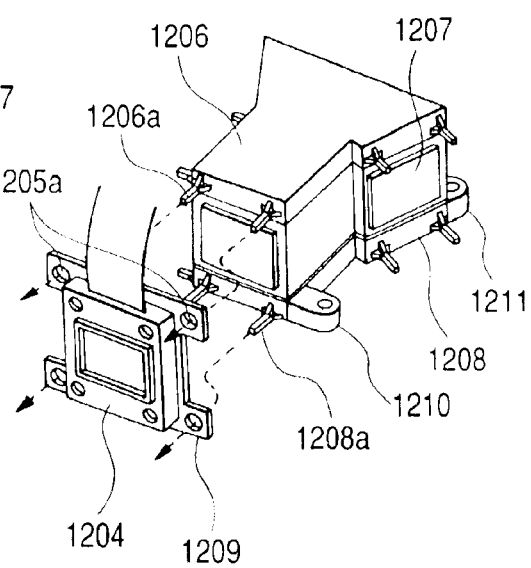
Figure 18:
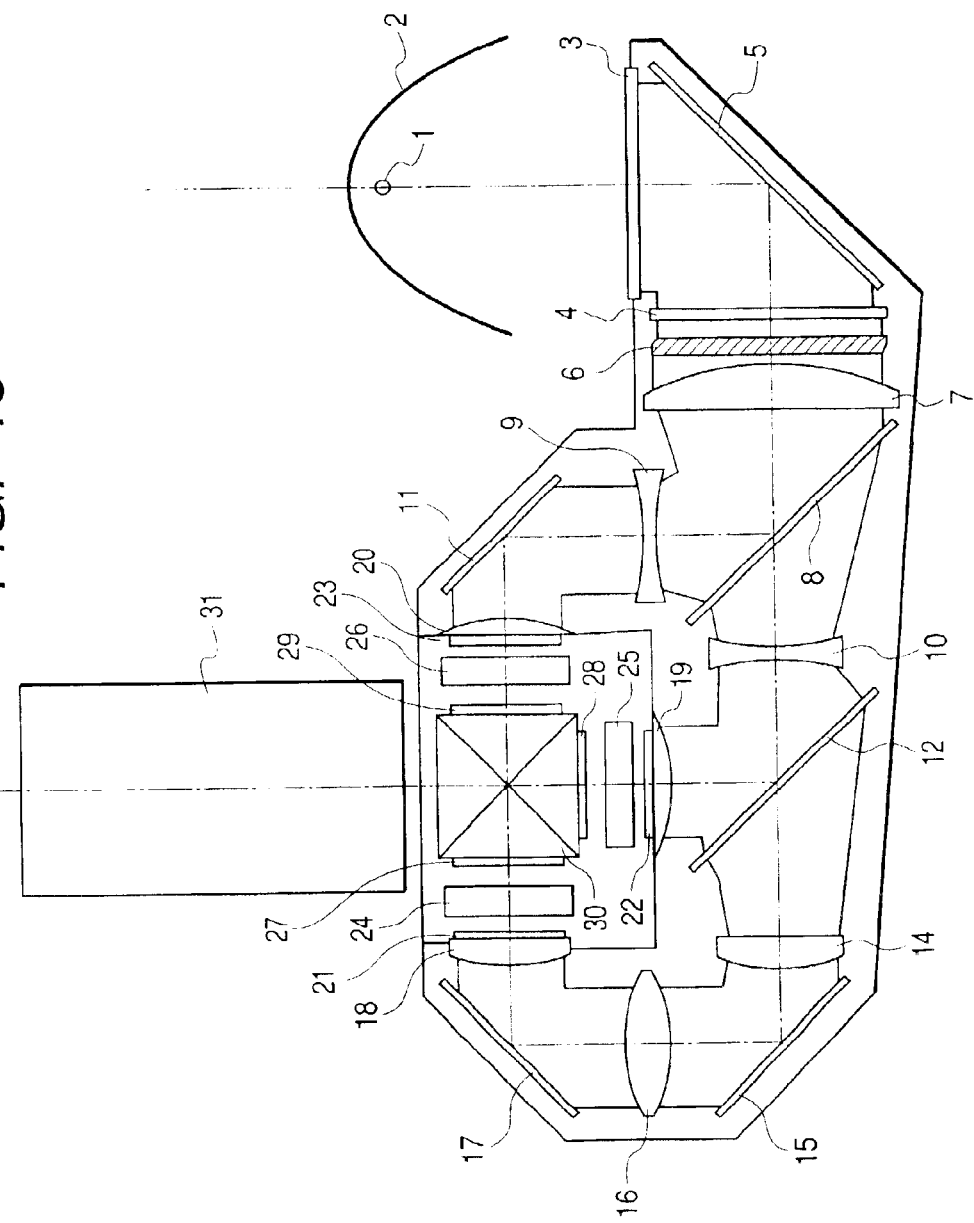
FIG. 18 is an illustration showing an optical system in a conventional liquid crystal projector.
Figure 19:
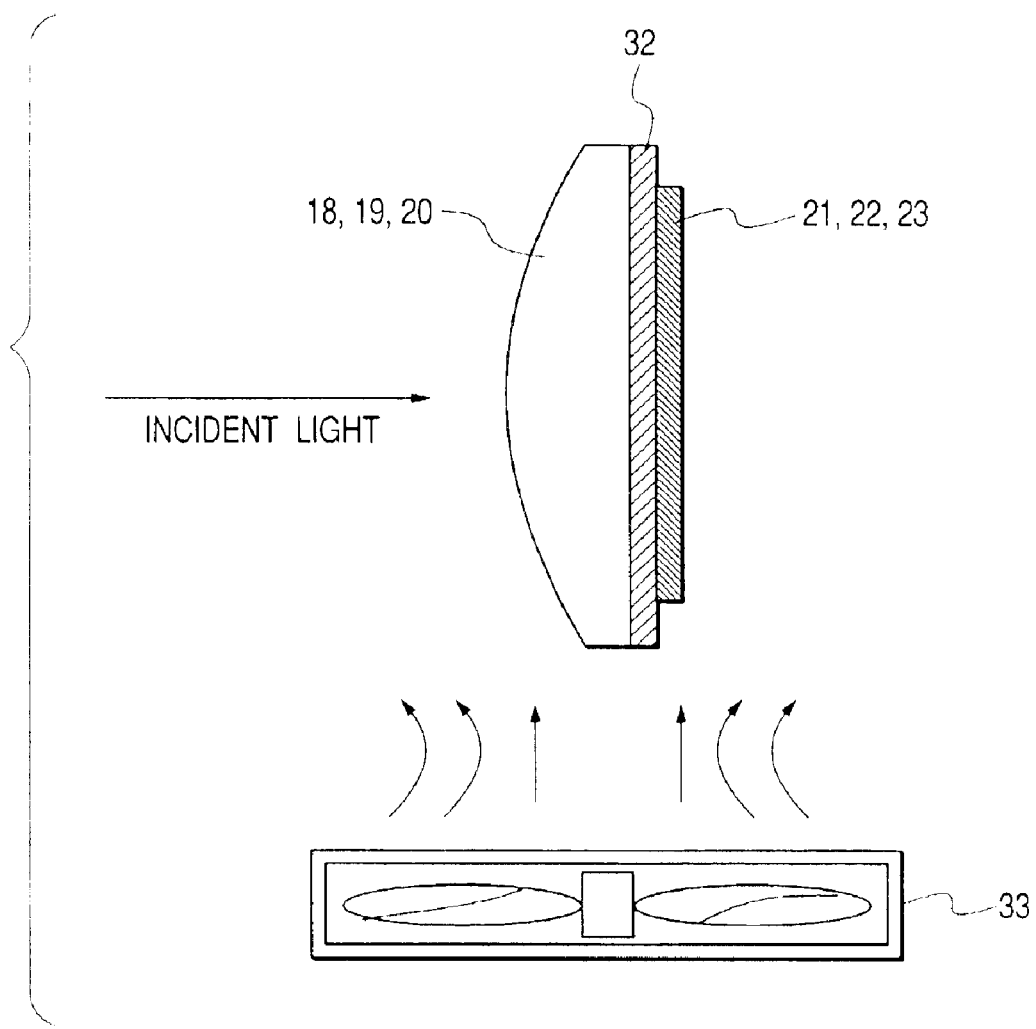
FIG. 19 is an illustration showing a filter and a polarizing plate in the conventional liquid crystal projector.
Figure 20:
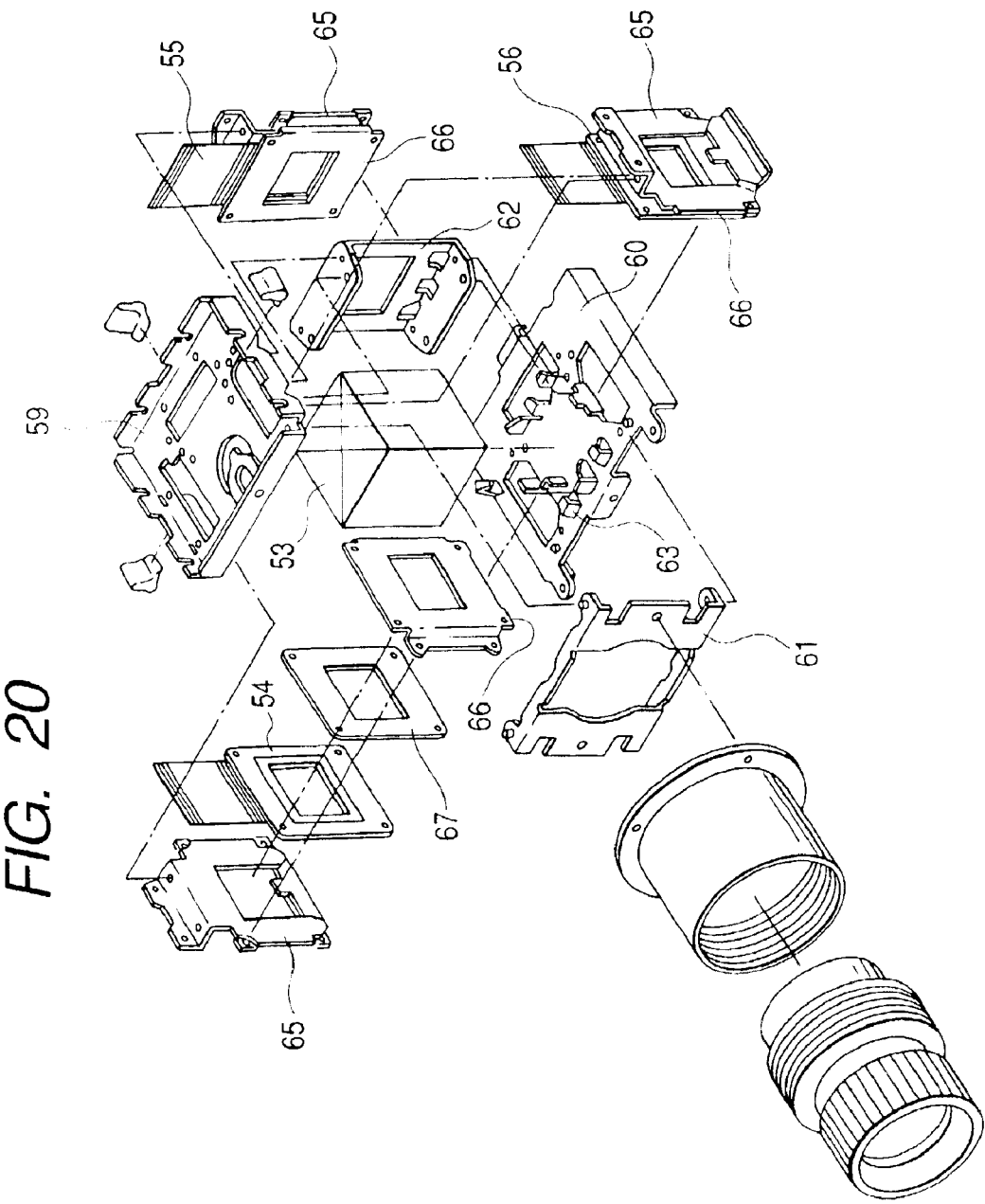
FIG. 20 is an exploded perspective view of an optical system in a conventional liquid crystal projector.

FIGS. 17C and 17D show configurations wherein the prism 1207 held by the prism seat (upper seat 1206 and lower seat 1208) is not the cross prism shown in FIGS. 17A and 17B, but is a 4-piece prism of irregular shape in which four prisms are joined, or a 3-piece prism.

In these configurations, the holding pin forming portions 1206a, 1208a are also integrally formed in the upper seat 1206 and the lower seat 1208, and the lower seat 1208 is provided with the positioning mechanism and mounting portions 1210, 1211 for mounting the unit on the illumination optical box.

On the other hand, holes 1204a or 1205a for the above holding pin forming portions 1206a, 1208a to be inserted into are formed in the liquid crystal panel 1204 (FIG. 17C) or in the metal plate 1205 (FIG. 17D) to which the liquid crystal panel 1204 is screwed.

In these FIGS. 17A–17D, the holding pin forming portions of the prism seat are inserted into the holes 1204a of the liquid crystal panel 1204 or the holes 1205a of the metal plate 1205 and the liquid crystal panel 1204 is positioned relative to the prism 1202, 1207 by an unrepresented jig. In this state, an ultraviolet-curing adhesive is applied to the areas around the holes and holding pin forming portions and the adhesive is cured under irradiation with ultraviolet light.

This results in fixing the liquid crystal panel 1204 in a state in which it is positioned relative to the prism.

As described above, the portions for holding a second optical member are integrally formed in the support member such as the seat for supporting the prism type optical element, whereby it is feasible to hold the second optical member with good positional accuracy relative to the prism type optical element by the small number of parts.

Since the shielding portion to block unwanted rays is integrally formed in the support member such as the seat for supporting the prism type optical element, it is feasible to securely block entrance of unwanted rays into the prism type optical element and exit of unwanted rays from the prism type optical element by the small number of parts.

What is claimed is:

1. A color separating-combining optical system comprising:
   a separating optical system which separates light from a light source into a plurality of color spectrums;
   a combining optical system which combines light spectrums from a plurality of image display elements illuminated by the respective color spectrums; and a support member which supports a prism type optical element located in the separating optical system or the combining optical system;

wherein said support member comprises a holding portion which holds another optical member different from the prism type optical element.

2. An optical system according to claim 1, wherein said holding portion has elasticity and said holding portion holds said second optical member by the elasticity.

3. An optical system according to claim 1, wherein said holding portion has elasticity and said holding portion rotatably holds said second optical member by the elasticity.

4. An optical system according to claim 1, wherein said optical member is either one selected from a polarizing plate, a wave plate, a phase plate, an optical filter, a lens, and an image display element.

5. An image display optical system comprising:

the color separating-combining optical system as set forth in claim 1;

an illumination system which feeds illumination light into said color separating-combining optical system; and a projection optical system which projects combined light existing said color separating-combining optical system.

6. A projection image display apparatus comprising:

a plurality of image display elements; and the image display optical system as set forth in claim 5.

7. A color separating-combining optical system comprising:

a separating optical system which separates light from a light source into a plurality of color spectrums;

a combining optical system which combines light spectrums from a plurality of image display elements illuminated by the respective color spectrums; and a support member which supports a prism type optical element located in the separating optical system or the combining optical system, wherein said support member comprises a shielding portion which blocks emergence of unwanted light from said prism type optical element.

8. An image display optical system comprising:

the color separating-combining optical system as set forth in claim 7;

an illumination system which feeds illumination light into said color separating-combining optical system; and a projection optical system which projects combined light existing said color separating-combining optical system.

9. A projection image display apparatus comprising:

a plurality of image display elements; and the image display optical system as set forth in claim 8.

10. A color separating-combining optical system comprising:

a separating optical system which separates light from a light source into first, second and third color spectrums, illuminates a first image display element by said first color spectrum, illuminates a second image display element by said second color spectrum, and illuminates a third image display element by said third color spectrum;

a combining optical system which combines respective color spectrums from said first, second and third image display devices;

a filter which transmits a color spectrum of a specific wavelength band:

first, second and third polarizing elements each of which is disposed on a light entrance side of respective said image display elements, and is adapted to analyze corresponding said color spectrum incident into respective said image display element; and a curved mirror which is disposed between said color separating optical system and said first image display element, wherein said filter is placed apart from said first polarizing element, between said curved mirror and said first image display element.

11. An optical system according to claim 10, wherein said filter comprises a dichroic film.

12. An optical system according to claim 10, further comprising:

a transparent substrate, wherein said filter is disposed on one surface of said transparent substrate, and said polarizing element is disposed on another surface of said transparent substrate.

13. An optical system according to claim 10, wherein said color spectrum of the specific wavelength band is red light.

14. An image display optical system comprising:

the color separating-combining optical system as set forth in claim 10;

an illumination system which feeds illumination light into said color separating-combining optical system; and a projection optical system which projects combined light exiting said color separating-combining optical system.

15. A projection image display apparatus comprising:

three image display elements; and the image display optical system as set forth in claim 14.

16. A color separating-combining optical system comprising:

a separating optical system which separates light from a light source into a first, second and third color spectrums, illuminates a first image display element by said first color spectrum, illuminates a second image display element by said second color spectrum, and illuminates a third image display element by said third color spectrum;

a combining optical system which combines respective color spectrums from said first, second and third image display devices;

first and second filters, each of which transmits a color spectrum of a specific wavelength band:

first, second and third polarizing elements, each of which is disposed on a light entrance side of respective said image display elements, and is adapted to analyze corresponding said color spectrum incident into respective said image display element;

a first curved mirror which is disposed between said color separating optical system and said first image display element; and a second curved mirror which is disposed between said color separating optical system and said second image display element, wherein said first filter is placed apart from said first polarizing element, between said first curved mirror and said first image display element, and said second filter is placed apart from said second polarizing element, between said second curved mirror and said second image display element.

17. An optical system according to claim 16, wherein each of said first and second filters comprises a dichroic film.

18. An optical system according to claim 16, further comprising:
  first and second transparent substrates, wherein said first filter is disposed on one surface of said first transparent substrate, and said first polarizing element is disposed on another surface of said first transparent substrate, and
  said second filter is disposed on one surface of said second transparent substrate, and said second polarizing element is disposed on another surface of said second transparent substrate.

19. An optical system according to claim 16, wherein said color spectrum of the specific wavelength band of said first filter is red light.

20. An optical system according to claim 16, wherein said color spectrum of the specific wavelength band of said second filter is green light.

21. An image display optical system comprising:
  the color separating-combining optical system as set forth in claim 16;
  an illumination system which feeds illumination light into said color separating-combining optical system; and
  a projection optical system which projects combined light exiting said color separating-combining optical system.

22. A projection image display apparatus comprising:
  three image display elements; and
  the image display optical system as set forth in claim 21.

23. A color separating-combining optical system comprising:
  a separating optical system, which separates light from a light source into first, second and third color spectrums, illuminates a first image display element by said first color spectrum, illuminates a second image display element by said second color spectrum, and illuminates a third image display element by said third color spectrum;
  a combining optical system which combines respective color spectrums from said first, second and third image display devices;
  a filter which transmits a color spectrum of a specific wavelength band;
  first, second and third polarizing elements each of which is disposed on a light entrance side of respective said image display elements, and is adapted to analyze corresponding said color spectrum incident into respective said image display element; and
  a transparent substrate which is located between said separating optical system and said first image display element,
  wherein said filter is disposed on one surface of said transparent substrate, and said first polarizing element is disposed on another surface of said transparent substrate, and
  wherein a size of said first polarizing element is smaller than that of said filter.

24. An optical system according to claim 23 further comprising a fan, and wherein air from said fan flows to said filter and said first polarizing element.

25. An optical system according to claim 23, wherein said filter comprises a dichroic film.

26. An optical system according to claim 23, wherein said color spectrum of the specific wavelength band is red light.

27. An image display optical system comprising:
  the color separating-combining optical system as set forth in claim 23;
  an illumination system which feeds illumination light into said color separating-combining optical system; and
  a projection optical system which projects combined light exiting said color separating-combining optical system.

28. A projection image display apparatus comprising:
  three image display elements; and
  the image display optical system as set forth in claim 27.

29. A color combining optical system comprising:
  a color combining optical system which combines a plurality of light beams each of which has a wavelength region different from others; and
  a support member which supports said color combining optical system,
  wherein said support member comprises a holding portion which holds an optical member other than said color combining optical system.

30. An optical apparatus according to claim 29, wherein said color combining optical system has a prism type optical element.

31. An optical apparatus according to claim 29, wherein said optical member other than said color combining optical system has a polarizing plate.

32. An image display apparatus comprising:
  a color combining optical apparatus according to claim 29; and
  a projection optical system which projects light combined by said color combining optical apparatus.

33. An apparatus according to claim 32, further comprising a plurality of image display elements which feed said plurality of light beams having wavelength regions different from each other.

34. An image display apparatus comprising:
  three image display elements;
  an illumination optical system for illuminating the three image display elements with three light beams from a light source, wherein each of the three light beams has a wavelength region different from others;
  a color combining optical system which combines three light beams respectively from corresponding each of three image display elements, and includes a prism type optical element; and
  a support member which supports the prism type optical element, wherein the support member comprises a holding portion which holds an optical member other than said prism type optical element.

35. An apparatus according to claim 34, wherein the optical member other than said prism type optical element is a polarization plate.

36. An apparatus to claim 34, wherein the three image display elements are transmission type display element.

37. An apparatus according to claim 34, wherein the optical member other than said prism type optical element is a ¼ wavelength plate.

38. An apparatus according to claim 34, wherein the optical member other than said prism type optical element is a ½ wavelength plate.

39. An apparatus according to claim 34, wherein the three image display elements are reflection type image display elements.

* * * * *